US008496334B2

(12) United States Patent
Itoh

(10) Patent No.: US 8,496,334 B2
(45) Date of Patent: Jul. 30, 2013

(54) ILLUMINATION APPARATUS, PROJECTOR, AND ILLUMINATION METHOD

(75) Inventor: Yoshitaka Itoh, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 329 days.

(21) Appl. No.: 12/406,530

(22) Filed: Mar. 18, 2009

(65) Prior Publication Data
US 2009/0237618 A1 Sep. 24, 2009

(30) Foreign Application Priority Data

Mar. 19, 2008 (JP) .................................. 2008-071507
Jan. 27, 2009 (JP) .................................. 2009-015525

(51) Int. Cl.
G03B 21/26 (2006.01)
F21V 1/00 (2006.01)
F21V 11/00 (2006.01)

(52) U.S. Cl.
USPC ............................................. 353/94; 362/236

(58) Field of Classification Search
USPC ............ 353/99, 98, 94, 81, 30, 102; 359/638, 359/639, 833; 362/236, 241, 244
See application file for complete search history.

(56) References Cited

U.S. PATENT DOCUMENTS

| 6,665,122 | B1 | 12/2003 | Yamagishi |
| 7,001,022 | B2 | 2/2006 | Kim et al. |
| 7,222,968 | B2 * | 5/2007 | Magarill et al. ................. 353/31 |
| 7,314,279 | B2 * | 1/2008 | Teijido et al. .................... 353/31 |
| 7,532,407 | B2 | 5/2009 | Hirata et al. |
| 7,982,958 | B2 | 7/2011 | Hirata et al. |
| 2004/0021835 | A1 * | 2/2004 | Yamada et al. .................. 353/74 |
| 2004/0145812 | A1 * | 7/2004 | Chang ........................... 359/630 |
| 2005/0024602 | A1 * | 2/2005 | Shimaoka et al. .............. 353/94 |
| 2006/0109425 | A1 * | 5/2006 | Liang et al. ..................... 353/31 |
| 2006/0114420 | A1 * | 6/2006 | Kim et al. ......................... 353/81 |
| 2008/0055903 | A1 | 3/2008 | Akiyama |
| 2011/0234982 | A1 | 9/2011 | Hirata et al. |

FOREIGN PATENT DOCUMENTS

| CN | 1411567 A | 4/2003 |
| CN | 101063520 A | 10/2007 |
| JP | A-06-265887 | 9/1994 |
| JP | A-2000-003612 | 1/2000 |
| JP | A-2001-228539 | 8/2001 |
| JP | A-2002-72083 | 3/2002 |
| JP | 2004070018 A * | 3/2004 |
| JP | A-2004-341424 | 12/2004 |
| JP | A-2005-234578 | 9/2005 |
| JP | A-2007-047408 | 2/2007 |

* cited by examiner

Primary Examiner — William C Dowling
Assistant Examiner — Ryan Howard
(74) Attorney, Agent, or Firm — Oliff & Berridge, PLC

(57) ABSTRACT

An illumination apparatus includes: a first light source section; a plurality of second light source sections; and an optical axis conversion element which allows a light incident from the first light source section to emit in such a way that an exiting optical axis of the light approximately coincides with an illumination optical axis, and allows lights incident from the plurality of second light source sections to emit in such a way that exiting optical axes of the lights become approximately parallel to the illumination optical axis in positions close to the illumination optical axis.

18 Claims, 23 Drawing Sheets

ILLUMINATION APPARATUS, PROJECTOR, AND ILLUMINATION METHOD

BACKGROUND

1. Technical Field

The present invention relates to an illumination apparatus which illuminates, for example, an image formation element, a projector which projects and displays an optical image formed in the image formation element on a screen by means of a projection lens, and an illumination method, and more particularly, to a configuration of an illumination apparatus including a plurality of light source sections.

2. Related Art

As one of apparatus capable of displaying a large screen video, a projector which illuminates a small image formation element, which forms an optical image in accordance with video information, with light from an illumination apparatus, and displays in a magnified scale the optical image on a screen or the like by means of a projection lens has been put to practical use. With this kind of projector, the magnification, and the increase in luminance, of a projection image, and a reduction in luminance and color variations having been strongly demanded, a high performance illumination apparatus for realizing them has been developed.

For example, with a projection type display apparatus (a projector) disclosed in JP-A-6-265887 (refer particularly to FIG. 1), an increase in intensity of a light illuminating a light valve (an image formation element) is achieved by using two light source sections, and also, a reduction in luminance and color variations of an illumination light is achieved by providing an integrator system corresponding to each light source section. As the optical properties of all optical elements, such as the image formation element typified by a liquid crystal light valve, a polarizing element, or the projection lens, have an angle dependence with respect to an incident light, in order to achieve an increase in quality of a display image, it is desirable to use a light source section which can emit an illumination light having a narrow dispersion in angular distribution.

However, according to the configuration of this projector, as the two light source sections are disposed in positions quite distant from the illumination optical axis, the angular distribution of the illumination lights is widely dispersed, and also, two groups of light source images formed on the pupil plane of the projection lens are formed in positions distant from a projection optical axis. As a result, an reduction in contrast of the display image occurring, it is not possible to increase the luminance of the display image as much as hoped for. Also, as the imaging performance of the projection lens, being high in the vicinity of the projection optical axis, decreases with distance from the projection optical axis, it is not possible to sufficiently achieve the imaging performance of the projection lens, causing a display image degradation. Furthermore, in the event that the two light source sections differ in light emitting property, luminance and color variations caused by a differing way of the projection light being shaded due to the vignetting of the projection lens occur in the display image.

A projection type display apparatus (a projector) with which it has been attempted to solve these problems is disclosed in JP-A-2000-3612 (refer particularly to FIG. 1). An illumination apparatus used herein, including two light source sections, each of which, having a first focal point in the vicinity of a light emitter, is formed of an ellipsoidal reflector, has a configuration wherein a reflecting prism (a reflecting surface) is disposed at a second focal point of each ellipsoidal reflector, and a luminous flux from each light source section is reflected toward an integrator side by the reflecting prism. By this means, the positions of secondary light source images of the light emitters formed on the reflecting surfaces of the reflecting prisms are brought closer to an illumination axis than the original positions of the light emitters. As it is possible to handle the positions of the secondary light source images by taking them to be light source positions, it being the case that the two light source sections are disposed quite near to the illumination optical axis, it is possible to remedy the heretofore described problems.

However, in the illumination apparatus described in JP-A-2000-3612 too, the light source images formed on the pupil plane of the projection lens are still formed in positions distant from the projection optical axis. This is because, although the formation of the secondary light source image from each light source section in a position as near to the illumination optical axis as possible is nothing but the formation of each secondary light source image in a position as near to a vertex of the reflecting prism as possible, as the secondary light source images have a certain finite size, an appropriate area being required for the reflecting surfaces, it is not possible to reflect a luminous flux in the nearest vicinity of the vertex of the reflecting prism. Consequently, as it happens that a greater portion of the light source images does not exist on the projection optical axis on which a highest imaging performance is achieved in the projection lens, a greater effectiveness of remedying the problems can be hoped for than in the case of the projector disclosed in JP-A-6-265887, but this is not necessarily sufficient.

SUMMARY

An advantage of some aspects of the invention is to realize an illumination apparatus including a plurality of light source sections, wherein it is possible to achieve a reduction in luminance and color variations of an illumination light, as well as sufficiently achieving an imaging performance. Also, another advantage is to realize a projector including this kind of illumination apparatus.

An illumination apparatus according to an aspect of the invention includes: a first light source section; a plurality of second light source sections; and an optical axis conversion element which allows a light incident from the first light source section to emit in such a way that an exiting optical axis of the light approximately coincides with an illumination optical axis, and allows lights incident from the plurality of second light source sections to emit in such a way that exiting optical axes of the lights become approximately parallel to the illumination optical axis in positions close to the illumination optical axis.

The "illumination optical axis" used in the present specification refers to a normal line which, being perpendicular to an illuminated surface which is an illumination object to be illuminated by the illumination apparatus of some aspects of the invention, passes through the center of the illuminated surface. Also, the "exiting optical axis" refers to the optical axis of a light which exits the optical axis conversion element.

According to the illumination apparatus of the aspect of the invention, the optical axis conversion element has the function of emitting a light incident from the first light source section in such a way that an exiting optical axis of the light approximately coincides with an illumination optical axis, and emitting lights incident from the plurality of second light source sections in such a way that exiting optical axes of the lights become approximately parallel to the illumination optical axis in positions close to the illumination optical axis. In this way, by using the optical axis conversion element when combining lights from a plurality of light source sections, it is possible to attain the condition in which optical axes of the lights from the plurality of light source sections are adjacent to each other, and furthermore, it is possible to dispose an optical axis of a light from at least one light source section on the illumination optical axis. By this means, as it is possible to form a combined luminous flux which is an illumination light in the condition in which luminous fluxes from the individual light source sections are adjacent to each other, and to dispose the highest intensity luminous flux in the approximate center of the combined flux, it is possible to generate an illumination light for which a dispersion in angular distribution is suppressed.

In the illumination apparatus according to the aspect of the invention, it is possible to adopt a configuration wherein the first light source section is disposed on the illumination optical axis, and the plurality of second light source sections are disposed in positions away from the illumination optical axis.

According to this configuration, it being possible to emit the light emitted from the first light source section onto the illumination optical axis without reflecting or refracting the light emitted from the first light source section, it is possible to simplify the configuration of the optical axis conversion element. Also, as the plurality of second light source sections are disposed in the positions away from the illumination optical axis, it does not happen that the plurality of light source sections interfere with the first light source section when installing the individual light source sections.

In the illumination apparatus according to the aspect of the invention, it is preferable that the light from the first light source section converges on the light exiting end of the optical axis conversion element, or in the vicinity thereof.

According to this configuration, it being possible to miniaturize the optical axis conversion element, it is possible to efficiently utilize the light from the first light source section.

In the illumination apparatus according to the aspect of the invention, it is possible to adopt a configuration wherein the optical axis conversion element reflects and emits the lights emitted from each of the plurality of second light source sections.

Although it is also acceptable that the optical axis conversion element has the configuration of refracting and emitting the lights emitted from the plurality of second light source sections, by adopting the configuration of reflecting and emitting the lights, it is possible to more greatly bend the optical axes of the lights emitted from the plurality of second light source sections, increasing the degree of freedom in disposing the first light source section and the plurality of second light source sections.

In the illumination apparatus according to the aspect of the invention, it is possible to adopt a configuration wherein, the optical axis conversion element having a plurality of reflecting surfaces tilted in such a way as to form a predetermined angle with the illumination optical axis, each of the lights emitted from the plurality of second light source sections is reflected by any reflecting surface among the plurality of reflecting surfaces.

According to this configuration, it is possible to realize an optical axis conversion element capable of achieving a function required for the invention with a simple configuration.

In the illumination apparatus according to the aspect of the invention, it is preferable that the lights from the second light source sections corresponding to individual reflecting surfaces configuring the plurality of reflecting surfaces converge on the corresponding reflecting surfaces, or in the vicinities thereof.

According to this configuration, it being possible to miniaturize the optical axis conversion element, it is possible to efficiently utilize the lights from the second light source sections.

As the reflecting surfaces of the optical axis conversion element, it is possible to use surface reflecting surfaces which surface reflect the lights emitted from each of the plurality of second light source sections.

According to this configuration, there is less limitation on an incident angle formed when causing the lights incident on the reflecting surfaces, increasing the degree of freedom in the positional relationship between the plurality of second light source sections and the optical axis conversion element.

In the illumination apparatus according to the aspect of the invention, it is preferable that a dielectric multilayer is formed on the reflecting surfaces.

According to this configuration, it is possible to use, for example, a multilayer in which tantalum pentoxide ($Ta_2O_5$), niobium oxide ($Nb_2O_5$), and silicon dioxide ($SiO_2$) are alternately laminated one onto another. As it is possible to realize a superior heat resistance and a high reflectance with this kind of multilayer, the multilayer is suitably used in the optical axis conversion element of some aspects of the invention.

Alternatively, as the reflecting surfaces of the optical axis conversion element, it is possible to use total reflecting surfaces which totally reflect the lights emitted from each of the plurality of second light source sections.

According to this configuration, as it is not necessary to form a reflection layer such as a dielectric multilayer or a metal film on the reflecting surfaces, and essentially no light loss occurs when reflecting the lights, it is possible to easily fabricate an optical axis conversion element which is high in efficiency and superior in heat resistance.

In the illumination apparatus according to the aspect of the invention, as one example of the optical axis conversion element, it is possible to use a tubelike optical member which, having a tapered shape, has a hole passing through in a direction parallel to the illumination optical axis.

According to this configuration, as well as it being possible to achieve a reduction in weight and cost of the optical axis conversion element, as no physical interface exists in a pathway through which light in the optical axis conversion element is transmitted, it is possible to reduce a light loss due to an interference reflection or the like for the light from the first light source section. Also, it being easy to dissipate heat generated on the reflecting surfaces, it is easy to increase the heat resistance.

Alternatively, in the illumination apparatus according to the aspect of the invention, as the optical axis conversion elements it is possible to use a solid, prism shaped optical member.

According to this configuration, it is easy to increase the accuracy of formation of the reflecting surfaces. Also, in the case of disposing the first light source section on the illumination optical axis, as it is possible to shorten an optical path length, it is easy to miniaturize the illumination apparatus.

Alternatively, in the illumination apparatus according to the aspect of the invention, as the optical axis conversion element, it is possible to use an optical member having an internal space hollowed out.

According to this configuration, it is possible to increase a reflectance by utilizing a total reflection. Also, as a reflection layer such as a dielectric multilayer is not necessary, it is possible to suppress the thermal damage and thermal degradation of the optical axis conversion element.

In the illumination apparatus according to the aspect of the invention, it is possible to adopt a configuration wherein the optical axis conversion element refracts and emits the lights emitted from each of the plurality of second light source sections.

According to this configuration, it being possible to achieve the miniaturization of the optical axis conversion element in some cases, it is possible to contribute to the miniaturization of the illumination apparatus.

In the illumination apparatus according to the aspect of the invention, it is also acceptable to adopt a configuration wherein the optical axis conversion element has a pair of parallel planes approximately perpendicular to the illumination optical axis, and the light emitted from the first light source section is transmitted through the parallel planes. Alternatively, it is also possible to adopt a configuration wherein the optical axis conversion element has a hollow portion passing through in a direction in which the illumination optical axis extends, and the light emitted from the first light source section is transmitted through the hollow portion.

According particularly to the latter configuration, as the number of physical interfaces which transmit the luminous flux from the first light source section decreases, a light loss at the interfaces is reduced, and it is possible to increase a light use efficiency in the optical axis conversion element.

In the illumination apparatus according to the aspect of the invention, it is also acceptable to adopt a configuration wherein a first light source section optical axis conversion element which bends the optical axis of the light emitted from the first light source section is provided on the light incident side of the optical axis conversion element.

According to this configuration, the degree of freedom in the disposition place of the first light source section being improved, it is possible to reduce a dimension of the illumination apparatus in a direction along the illumination optical axis.

In the illumination apparatus according to the aspect of the invention, it is also acceptable to adopt a configuration wherein a second light source section optical axis conversion element which bends the optical axis of the light emitted from at least one of the plurality of second light source sections is provided on the light incident side of the optical axis conversion element.

According to this configuration, as a physical interference between the light source sections is unlikely to occur, and the degree of freedom in the disposition places of the individual light source sections is improved, it is possible to achieve the miniaturization of the illumination apparatus.

In the illumination apparatus according to the aspect of the invention, it is preferable that a heat dissipation member is provided on the optical axis conversion element.

According to this configuration, it is possible to further increase the heat resistance of the optical axis conversion element.

In the illumination apparatus according to the aspect of the invention, it is preferable that the optical axis conversion element is housed in a casing having a light transmissivity.

According to this configuration, it is possible to prevent dust and dirt from adhering to the reflecting surfaces of the optical axis conversion element, and to prevent a deterioration in reflective performance of the reflecting surfaces due to a burn or scorch resulting from the adhesion of dust and dirt.

A projector according to another aspect of the invention includes: the illumination apparatus according to the heretofore described aspect of the invention; an optical modulator which modulates light from the illumination apparatus; and a projection system which magnifies and projects the light modulated by the optical modulator.

In the projector including the illumination apparatus according to the heretofore described aspect of the invention, as the dispersion in angular distribution is suppressed, it is possible to realize a high light use efficiency. Also, as a plurality of light source images formed on the pupil plane of the projection system are concentrated in a region approximately centered on a projection optical axis, and formed in an approximately symmetrical condition, it being easy to achieve the intrinsic imaging performance of a projection lens, it is possible to realize a display image which, having small luminance and color variations, is superior in uniformity. Furthermore, it not happening that large luminance variations occur in the event that one or two light source sections are turned off, it is possible to improve usability.

An illumination method according to another aspect of the invention includes, providing an optical axis conversion element; and allowing a light emitted from a first light source section to emit toward an illumination object in such a way that an exiting optical axis of the light approximately coincides with an illumination optical axis and lights emitted from a plurality of second light source sections to emit toward the illumination object in such a way that exiting optical axes of the lights become approximately parallel to the illumination optical axis in positions close to the illumination optical axis.

According to the illumination method of the aspect of the invention, as it is possible to form a combined luminous flux which is an illumination light in the condition in which the luminous fluxes from the individual light source sections are adjacent to each other, and to dispose a highest intensity luminous flux in the approximate center of the combined luminous flux, it is possible to generate an illumination light for which the dispersion in angular distribution is suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereafter, a description will be given of a first embodiment of the invention, referring to FIGS. 1 to 9.

Figure 1:
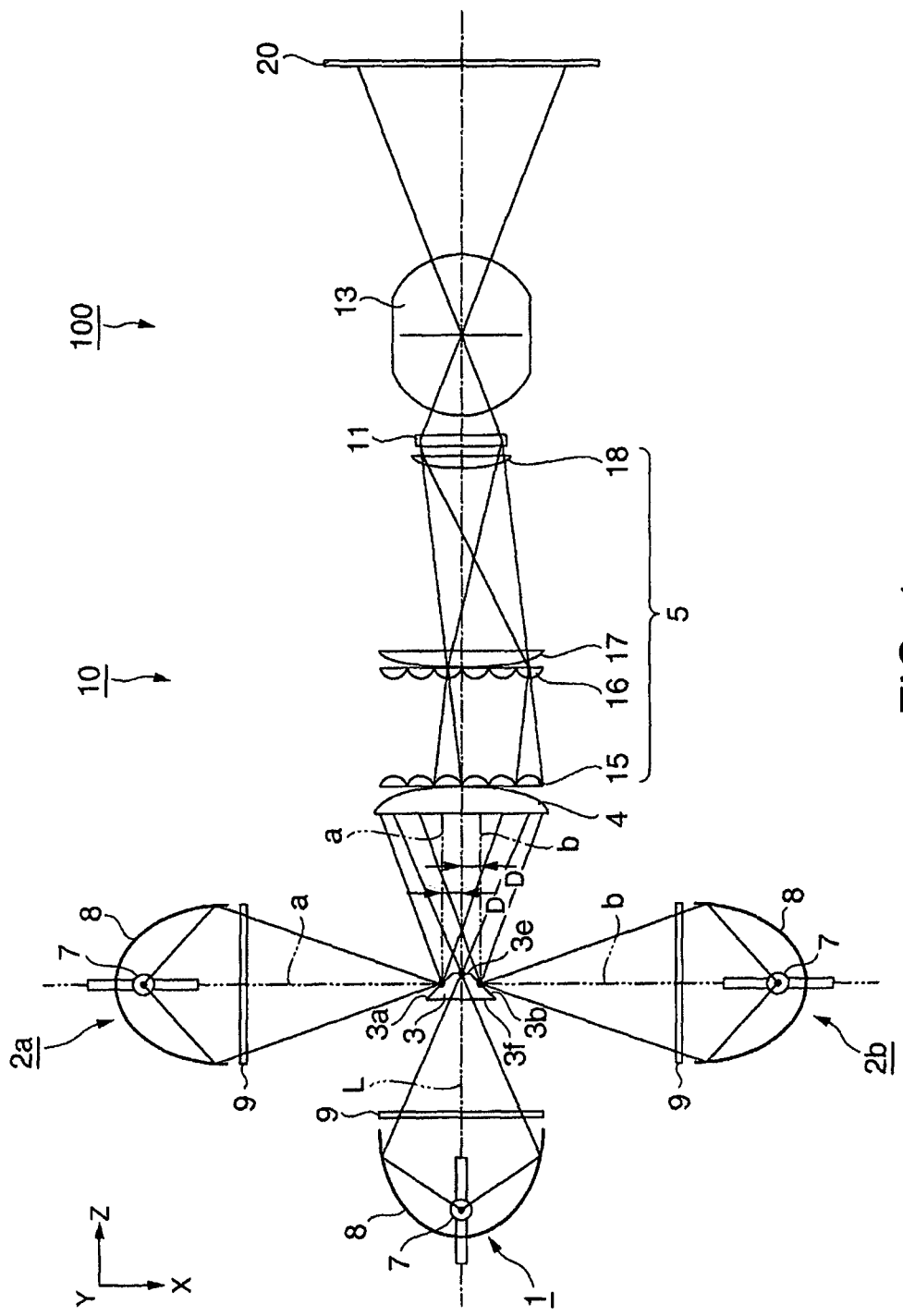
FIG. 1 shows one configuration example of a projector including an illumination apparatus of a first embodiment of the invention.
Figure 5:
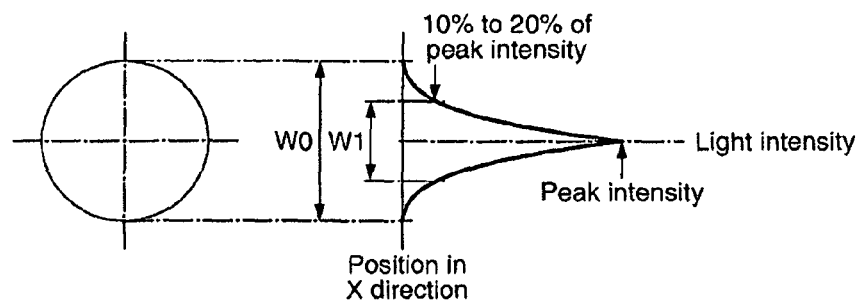
FIG. 5 is a diagram showing the light intensity distribution of a collected light spot of an illumination light.
Figure 6:
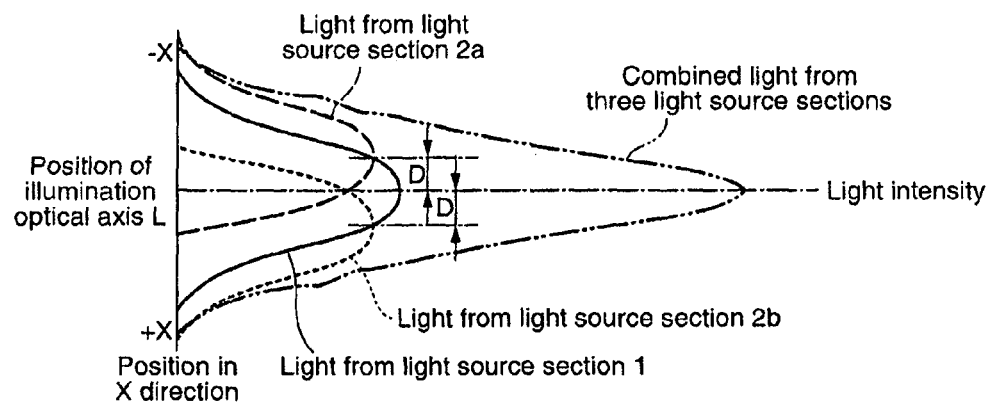
FIG. 6 is a diagram showing the intensity distribution of lights from individual light source sections incident on a combining lens.
Figure 7:
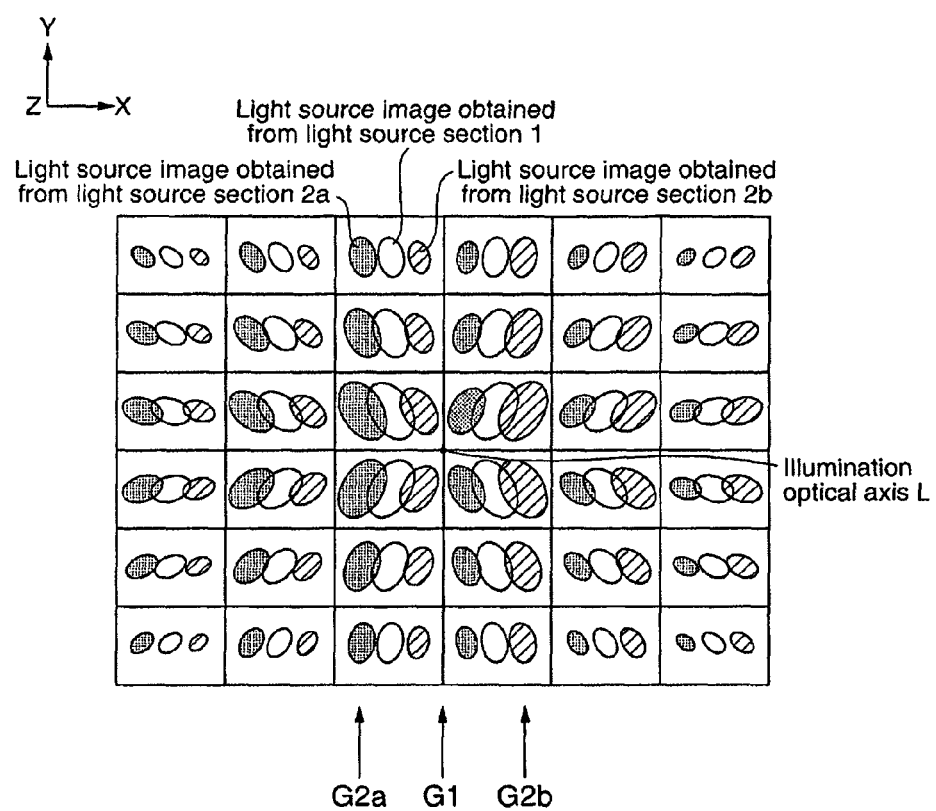
FIG. 7 shows a light source image formation condition in a second lens array.
Figure 8:
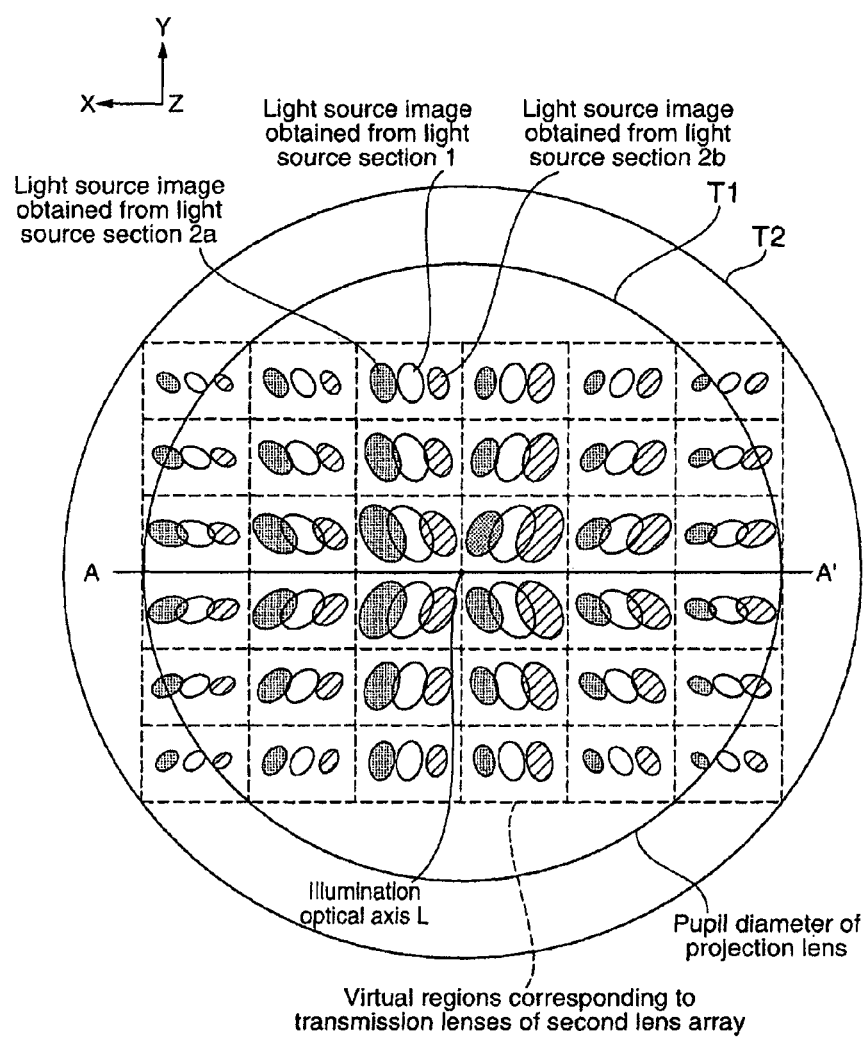
FIG. 8 shows a light source image formation condition in the pupil plane of a projection lens.
Figure 9:
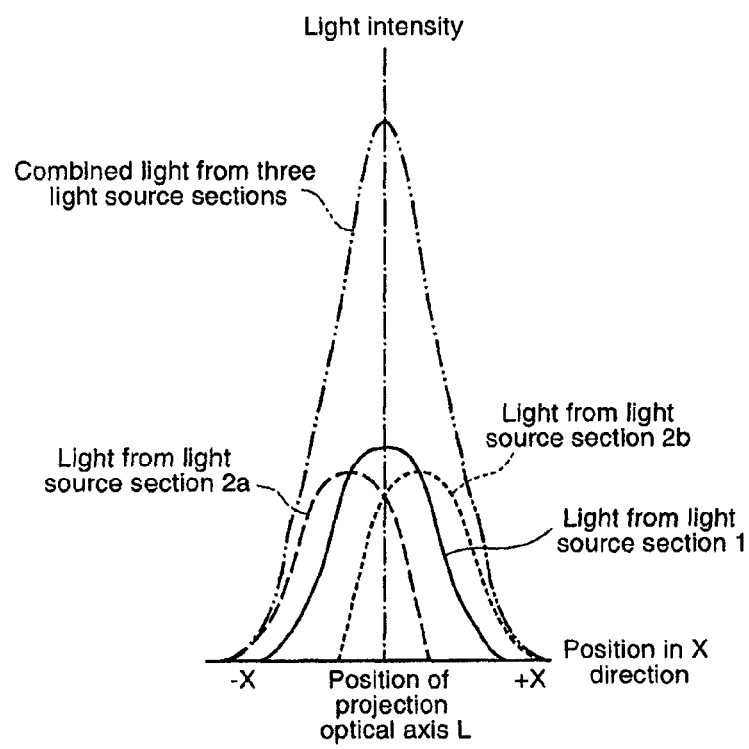
FIG. 9 is a diagram showing a virtual light intensity distribution on the line A-A' of FIG. 8.

FIG. 1 shows one configuration example of a projector including an illumination apparatus according to the embodiment. FIGS. 2 to 4C show several configuration examples of a reflector used in the illumination apparatus of the embodiment. FIG. 5 is a diagram showing the light intensity distribution of a collected light spot of an illumination light. FIG. 6 is a diagram showing the intensity distribution of lights, one from each light source section, which fall incident on a combining lens. FIG. 7 shows a condition of formation of light source images relating to corresponding light source sections in a second lens array of an integrator section. FIG. 8 shows a condition of formation of light source images on the pupil plane of a projection lens. FIG. 9 is a diagram showing a virtual light intensity distribution on the line A-A' of FIG. 8. In subsequent figures, in order to make components more visible, the scale may be caused to differ from one component to another when appropriate.

A projector 100 including the illumination apparatus according to the embodiment is shown in FIG. 1. The illumination apparatus 10 generates a light for illuminating a light valve 11 (an optical modulator), such as a liquid crystal display device having a pixel structure, or a micromirror array device in which a plurality of movable mirrors are provided in an array.

The illumination apparatus 10 according to the embodiment mainly includes three light source sections, including one first light source section 1 and two light source sections 2a and 2b, a square truncated pyramid shaped reflector 3 (an optical axis conversion element) a combining lens 4, and an integrator section 5.

Each of the three light source sections 1, 2a and 2b includes a light emitting lamp 7 and a reflector 8. As the light emitting lamp 7, it is possible to use a high pressure mercury-vapor lamp, a metal halide lamp, a xenon lamp, an LED, or the like, while an ellipsoidal reflector having a reflecting surface of an ellipsoidal shape is suitable as the reflector 8. It is also acceptable to use a paraboloidal reflector having a reflecting surface of a paraboloidal shape, and a collective lens, in place of the ellipsoidal reflector.

The ellipsoidal reflector 8 has two focal point positions, a first focal point position and a second focal point position. The light emitting lamp 7 is disposed in such a way that a light emitting point of the light emitting lamp 7 is positioned in the first focal point position of the ellipsoidal reflector 8. As a light emitter such as the light emitting lamp 7 has a three-dimensional light emitting region in which a luminance differs depending on a spatial position, it is appropriate to take a luminance centroid as the light emitting point. As such, a light emitted from the light emitting lamp 7, as well as being reflected, is collected by the reflector 8. Then, the light, after unnecessary ultraviolet light and infrared light are removed therefrom by a UV/IR cut filter 9, is collected in the second focal point position, forming a light emitter image (a collected light spot). As the image is a real image, it is possible to take the image as a secondary light source, as opposed to the original light emitter. For this reason, in a subsequent optical system, it is possible to handle a light, emitted from a light emitter originally placed in a remote position, as a light emitted from the secondary light source.

Figure 2:
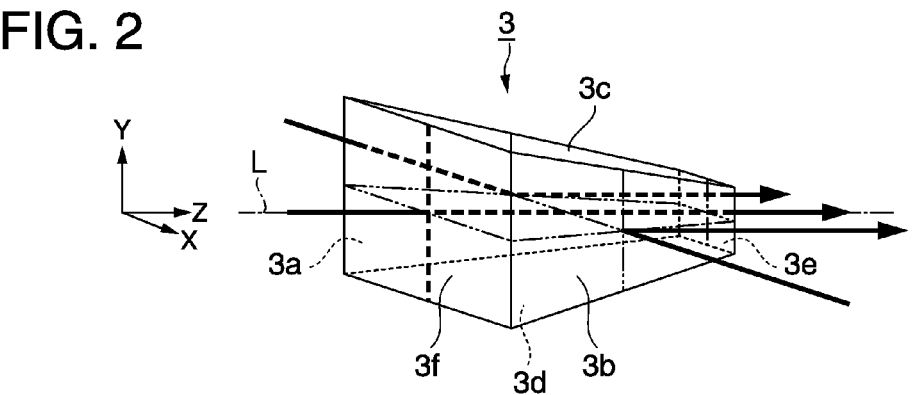
FIG. 2 shows a configuration example of a reflector used in the illumination apparatus of the embodiment.

Configuration examples of the square truncated pyramid shaped reflector are shown in FIGS. 2 to 4C. A square truncated pyramid shaped reflector 3 shown in FIG. 2 is an optical element which includes two approximately opposed reflecting surfaces 3a and 3b as side surfaces, two approximately opposed reflecting surfaces 3c and 3d as a top surface and a bottom surface, and two transmissive end faces 3e and 3f (a transmissive end face, the area of which is relatively small, is referred to as a "small transmissive end face" 3e, and a transmissive end face, the area of which is relatively large, as a "large transmissive end face" 3f) perpendicular to an illumination optical axis L. That is, the square truncated pyramid shaped reflector 3 of the embodiment has two transmissive end faces 3e and 3f (a pair of parallel planes) disposed parallel to each other in such a way as to be perpendicular to the illumination optical axis L, and four reflecting surfaces 3a, 3b, 3c and 3d (surface reflection surfaces) tilted in such a way as to form a predetermined angle with the two transmissive end faces 3e and 3f (or the illumination optical axis L).

The light from the first light source section 1 disposed on the illumination optical axis L is transmitted through the two transmissive end faces (the large transmissive end face 3f and the small transmissive end face 3e) of the square truncated pyramid shaped reflector 3, and travels in a Z direction, while lights, which are emitted from the two second light source sections 2a and 2b not positioned on the illumination optical axis L, and travel along an X axis, are reflected respectively by the reflecting surfaces 3a and 3b which are the side surfaces, and travel in the Z direction in the same way as the light from the first light source section 1. For this reason, the lights from the three light source sections 1, 2a and 2b are combined into an approximate one light on the illumination optical axis L, traveling in the same direction. Consequently, it is necessary for the square truncated pyramid shaped reflector 3 to include as the side surfaces at least a number of reflecting surfaces equal to or larger than the number (in the embodiment, two) of the light source sections 2a and 2b not positioned on the illumination optical axis L.

In the case of the embodiment, as the number of second light source sections 2a and 2b is two, it is sufficient that there are two reflecting surfaces but, the square truncated pyramid shaped reflector 3 shown in FIG. 2 having the four reflecting surfaces 3a, 3b, 3c and 3d, all the four reflecting surfaces have a trapezoidal shape of which a large transmissive end face 3f side edge is long, and a small transmissive end face 3e side edge is short, when viewed from directions opposite to the respective reflecting surfaces. That is, all the reflecting surfaces 3a, 3b, 3c and 3d are tilted at a predetermined angle to the large transmissive end face 3f and the small transmissive end face 3e (or the illumination optical axis L).

Figure 3A:
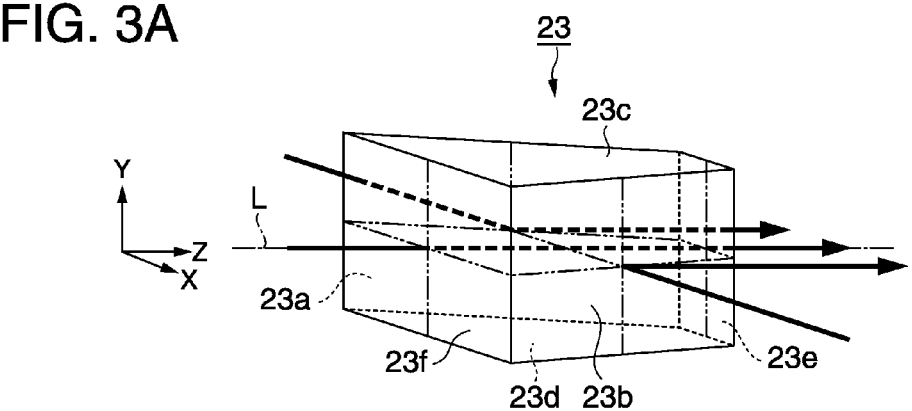
FIGS. 3A and 3B show other configuration examples of the reflector.
Figure 3B:
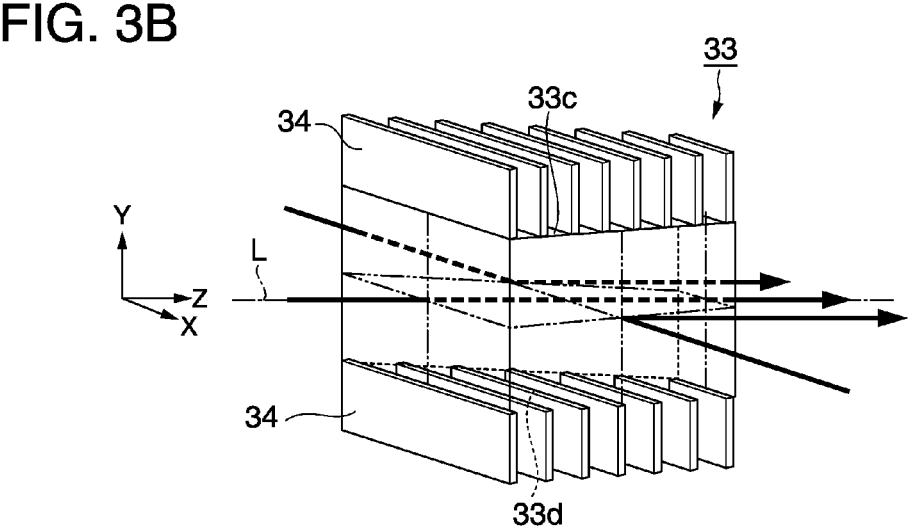

Configuration examples suitable in the case in which the number of light source sections is three are shown in FIG. 3A and 3B. A square truncated pyramid shaped reflector 23 shown in FIG. 3A having four side surfaces 23a, 23b, 23c and 23d, two side surfaces 23a and 23b on the side facing the second light source sections 2a and 2b, being reflecting surfaces, have a rectangular shape when viewed from a direction opposite to each relevant reflecting surface. The remaining two side surfaces 23c and 23d, not functioning as reflecting surfaces, have a trapezoidal shape of which a large transmissive end face 23f side edge is long, and a small transmissive end face 23e side edge is short, when viewed from directions opposite to the respective side surfaces. That is, only the two reflecting surfaces 23a and 23b are tilted at a predetermined angle to the large transmissive end face 23f and the small transmissive end face 23e (or the illumination optical axis L). According to the configuration of FIG. 3A, as it is possible to devote a large area to the reflecting surfaces 23a and 23b, it is easy to improve a heat dissipation property.

Alternatively, as a modification example of the square truncated pyramid shaped reflector 23 of FIG. 3A, with a square truncated pyramid shaped reflector 33 of FIG. 3B, radiation fins 34 (heat dissipation members) are provided on each of two side surfaces (a top surface and a bottom surface) 33c and 33d not functioning as reflecting surfaces. By means of this configuration, it is possible to further increase the heat dissipation property of the square truncated pyramid shaped reflector 33.

Figure 4A:
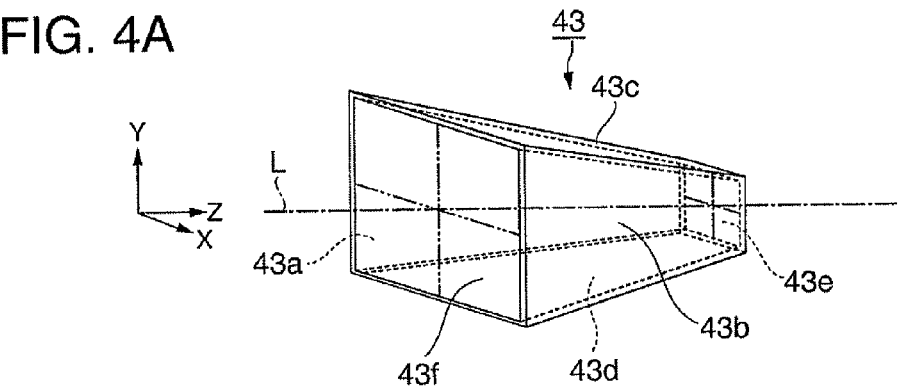
FIGS. 4A, 4B and 4C show still other configuration examples of the reflector.

Apart from the above, as a mode of the square truncated pyramid shaped reflector, it is possible to use a tubelike reflector 43 which, having a hole passing through in a direction of the illumination optical axis L, has a tapered shape with a plurality of reflecting surfaces 43a, 43b, 43c and 43d as outer surfaces, as shown in FIG. 4A. The square truncated pyramid shaped reflector 43 can be fabricated by, for example, bonding four plate bodies together, one surface of each of which is made a reflecting surface. In the square truncated pyramid shaped reflector 43, a virtual surface formed by four edges of the plate bodies on each of a light incident side and a light exiting side shall be called a "transmissive end surface". That is, the inner side of the four plate bodies configuring the square truncated pyramid shaped reflector 43 being a hollow portion passing through in a direction in which the illumination optical axis L extends, no physical interface exists in the transmissive end faces shown by reference characters 43e and 43f.

Figure 4B:
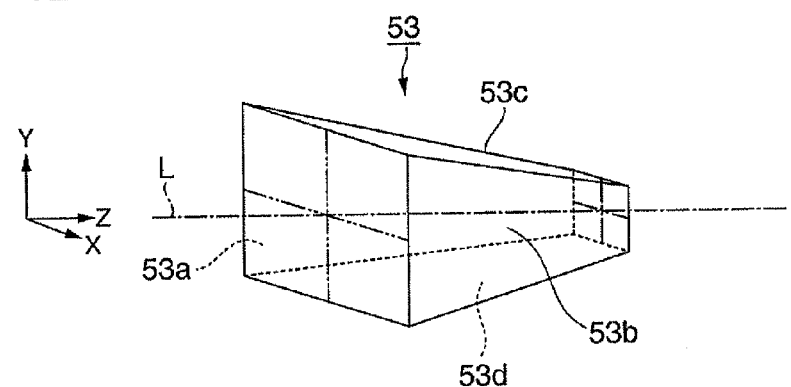

Alternatively, it is possible to use a solid prismoidal reflector 53, the outer shape of which is a polygonal truncated pyramid, in which reflecting surfaces 53a, 53b, 53c and 53d are formed on side surfaces of a square truncated pyramid shaped body made of a homogenous transparent medium, as shown in FIG. 4B.

Figure 4C:
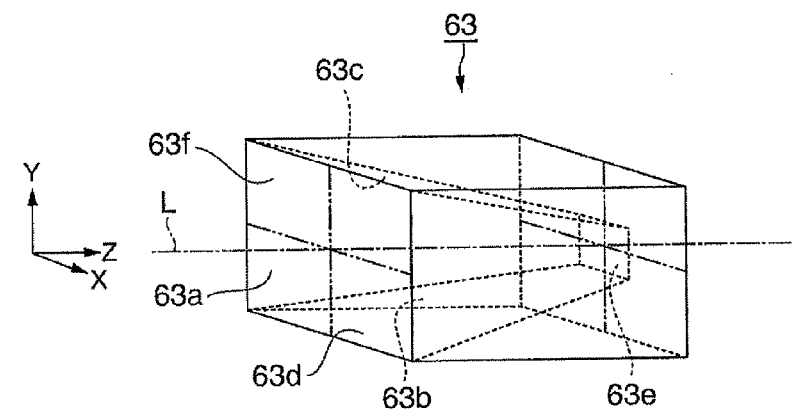

Alternatively, it is possible to use a rectangular parallelepiped shaped reflector 63 in which an inner portion of a rectangular parallelepiped made of a homogenous transparent medium is hollowed out into a square truncated pyramid shape, forming reflecting surfaces 63a, 63b, 63c and 63d on inner wall surfaces, as shown in FIG. 4C. In the square truncated pyramid shaped reflector 63 too, no physical interface exists in the transmissive end faces shown by reference characters 63e and 63f.

As the square truncated pyramid shaped reflector 43 of FIG. 4A is configured of a tubelike body, this is suitable for a reduction in weight and cost of the element and, as no physical interface exists in the transmissive end faces 43e and 43f of the reflector 43, it is possible to reduce a light loss due to an interface reflection or the like for the light from the first light source section 1. Also, it being easy to dissipate heat occurring on the reflecting surfaces 43a, 43b, 43c and 43d, it is easy to increase a heat resistance. With the square truncated pyramid shaped reflectors 53 and 63 of FIGS. 4B and 4C, as the plurality of reflecting surfaces are integrally formed, it is easy to increase a reflecting surface installation accuracy. Furthermore, the square truncated pyramid shaped reflector 63 of FIG. 4C has features wherein it is possible to obtain a high reflectance in the event that a reflecting surface installation angle is set in such a way as to fulfill total reflection conditions, it is easy to improve the heat dissipation property as it is possible to devote a large area to the reflecting surfaces which are the side surfaces, and so on. Also, as no physical interface exists in the transmissive end faces 63e and 63f, it is possible to reduce the light loss due to the interface reflection or the like for the light from the first light source section 1.

As each reflector is disposed in the position in which light is collected, or in the immediate vicinity thereof, as will be described hereafter, it being desirable to form the reflector from a medium having properties such as a superior heat resistance, a high thermal conductivity, and a low thermal expansion, sapphire, crystal, silica glass, or the like are suitable. Furthermore, in the case of using the transparent medium, as in the square truncated pyramid shaped reflectors 53 and 63 of FIGS. 4B and 4C, it is desirable to form the reflectors from a medium having a high transparency.

A reflection layer formed of a dielectric multilayer, an aluminum film, a silver film, or the like being formed on the reflecting surfaces of each reflector, light is reflected thereby with a high efficiency. As each reflector is disposed in the position in which light is collected, or in the immediate vicinity thereof, as the reflection layer, one superior in heat resistance being desirable, a multilayer in which tantalum pentoxide ($Ta_2O_5$), niobium pentoxide ($Nb_2O_5$), and silicon dioxide ($SiO_2$) are alternately laminated one onto another is suitable in that respect.

In the case of having the physical transmissive end faces, as in FIGS. 4B and 4C, it is desirable that an anti-reflection layer formed of a dielectric multilayer or the like is formed on the transmissive end faces.

As light, the intensity of which is very high, is collected on the reflecting surfaces, it is essential not to allow dust and dirt to adhere to the reflecting surfaces. This is because the reflecting surfaces are damaged by a combustion of dust and dirt adhering to the reflecting surfaces, causing a deterioration in reflective performance and a reduction in lifetime. Consequently, in order to prevent the adhesion of dust and dirt, a measure is effective wherein clean cooling air is constantly applied to the reflector, the reflector is disposed in a closed space which no dust or dirt enters (for example, a hermetically closed rectangular parallelepiped being configured of six transparent flat plates, the reflector is disposed inside it), or the like.

A description will be given, using FIG. 1, of an installation position of the square truncated pyramid shaped reflector 3.

The square truncated pyramid shaped reflector 3 is installed in such a way that the light emitter image (the collected light spot) obtained from the first light source section 1 disposed on the illumination optical axis L is positioned on the small transmissive end face 3e or in the vicinity thereof (that is, at a light existing end or in the vicinity thereof), and in such a way that two light emitter images (collected light spots) obtained from the two second light source sections 2a and 2b not positioned on the illumination optical axis L are positioned on the respective reflecting surfaces 3a and 3b or in the vicinities thereof. Consequently, it is desirable that the reflecting surfaces 3a and 3b have a size equal to that of the collected light spots.

It is also acceptable that the square truncated pyramid shaped reflector 3 is installed in such a way that the light emitter image (the collected light spot) obtained from the first light source section 1 is positioned slightly to the light source section side of the small transmissive end face 3e. According to this kind of configuration, as the distances between the positions of the light emitter images (the collected light spots) and the combining lens 4, to be described hereafter, can be made approximately equal by means of the positional relationship between the first light source section 1 disposed on the illumination optical axis L and the two second light source sections 2a and 2b not positioned on the illumination optical axis L, it is possible to suppress the dispersion in angular distribution of a combined luminous flux emitted from the combining lens 4.

Herein, illumination optical axes a and b of the two second light source sections 2a and 2b are disposed in such a way as to each be perpendicular to the illumination optical axis L, and the three light source sections 1, 2a and 2b are disposed in approximately the same plane (an XZ plane in FIG. 1) largely parallel to a plane including a long edge of the light valve 11 which is an illumination object, and the illumination optical axis L. In correlation to this, two reflecting surfaces 3a and 3b approximately facing each other across a Y axis of the square truncated pyramid shaped reflector 3 are formed in such a way as to form an angle of 45 degrees with the illumination optical axis L. For this reason, the illumination optical axes a and b of the two second light source sections 2a and 2b, after being bent by the reflecting surfaces 3a and 3b, become approximately parallel to the illumination optical axis L.

The angle which the reflecting surfaces 3a and 3b of the square truncated pyramid shaped reflector 3 form with the illumination optical axis L, not being limited to 45 degrees, is set correlated to the angle which the illumination optical axes a and b of the two second light source sections 2a and 2b form with the illumination optical axis L. That is, it is sufficient to set the angle of the reflecting surfaces 3a and 3b of the square truncated pyramid shaped reflector 3 in such a way that the two illumination optical axes a and b, after being reflected by the reflecting surfaces 3a and 3b of the square truncated pyramid shaped reflector 3, become approximately parallel to the illumination optical axis L.

By means of the above disposition, the secondary light source of the first light source section 1 is formed on the small transmissive end face 3e of the square truncated pyramid shaped reflector 3, while secondary light sources of the second light source sections 2a and 2b are formed respectively on the two approximately opposed reflecting surfaces 3a and 3b of the square truncated pyramid shaped reflector 3, and diverging lights with the same angle as that at a light collection time are emitted from these secondary light sources. The diverging lights emitted from three collected light spots incident on the combining lens 4, are converted into lights approximately parallel to their individual principal beams, and emitted as the combined luminous flux. As the combining lens 4, it is desirable to use an aspheric lens, a compound lens formed of a plurality of lenses, or the like, from the point of view of it being easy to reduce an optical aberration when parallelizing the diverging lights.

Herein, as the illumination optical axes a and b, after being reflected by the reflecting surfaces 3a and 3b, are each disposed a distance D away from the illumination optical axis L, lights incident on the combining lens 4 are not completely superimposed on each other. For this reason, the diameter of the combined luminous flux emitted from the combining lens 4 becomes larger than that of luminous fluxes incident on the combining lens 4 from the first light source section 1. In order to make the combined luminous flux diameter small, and increase an illumination efficiency in or after the combining lens 4 (on a projection lens 13 side), it is desirable to reduce the distance D of the illumination optical axes a and b from the illumination optical axis L. However, as the light emitters of the light source sections 1, 2a and 2b have a finite size, as heretofore described, the kind of collected light spot of a diameter W0 shown in FIG. 5 is formed in the second focal point position of the ellipsoidal reflector, and the distance D is constrained by the size of the collected light spot. That is, in the event that the distance D is set to less than W0/2, as there occur luminous fluxes traveling straight in directions of the opposed second light source sections 2a and 2b without being reflected by the reflecting surfaces 3a and 3b of the square truncated pyramid shaped reflector 3, the amount of luminous fluxes traveling in the direction of the combining lens 4 decreases, and the illumination efficiency decreases.

However, as the light intensity distribution in the collected light spot has an intensity distribution profile which is non-linear in a direction of its diameter, as shown in FIG. 5, in the event of setting the distance D to W1/2 with a diameter W1, in which the light intensity is reduced to around 5% to 20% of a peak intensity, as a reference, it is possible to increase the illumination efficiency in or after the combining lens 4 (on the projection lens 13 side) by reducing the combined luminous flux diameter while suppressing a reduction in the amount of luminous fluxes traveling in the direction of the combining lens 4.

The luminous fluxes incident on the combining lens 4 from the light source sections 1, 2a and 2b, and the luminous fluxes exiting from the combining lens 4, have, for example, the kinds of light intensity distribution shown in FIG. 6. The intensity of the light from the first light source section 1 positioned on the illumination optical axis L is highest, and the peak intensity position of the light is positioned approximately on the illumination optical axis L. Then, the lights from the two second light source sections 2a and 2b not positioned on the illumination optical axis L are distributed in such a way that their peak intensity positions exist in a position spaced largely the distance D away from the illumination optical axis L. Consequently, a combined luminous flux having an intensity distribution into which the light intensity distributions are combined is emitted from the combining lens 4. That is, an approximately parallel light which has a high peak intensity on the illumination optical axis L, and the light intensity of which decreases with distance from the illumination optical axis L, is emitted from the combining lens 4.

The combined luminous flux emitted from the combining lens 4 incident on the integrator section 5, is converted into a luminous flux, the illumination distribution of which in the illumination object is approximately uniform, illuminating the light valve 11 which is the illumination object. The integrator section 5 is mainly configured including a first lens array 15, a second lens array 16, a superimposing lens 17, and a parallelizing lens 18. The first lens array 15 and the second lens array 16 being light collection elements having the same number of lenses disposed in a matrix form, it is taken that the focal point distance of small lenses configuring the first lens array 15 is approximately equal to the distance between the first lens array 15 and the second lens array 16, and the contour shape thereof is of a shape approximately similar to the display region of the light valve 11 which is the illumination object. Although it is also acceptable that the focal point distance of transmission lenses configuring the second lens array 16 is set in such a way that the first lens array 15 and the illumination object (the light valve 11) are in an approximately conjugate relationship, and the contour shape thereof is equal to that of the small lenses of the first lens array 15, it is also acceptable to improve a light use efficiency by appropriately transforming the outer shape, or increasing the size.

After the combined luminous flux is incident on the first lens array 15, and is divided into a plurality of partial luminous fluxes, the partial luminous fluxes converge into corresponding transmission lenses of the second lens array 16, forming the light emitter images (the light source images) of each light source section. A light source image formation condition in the second lens array 16 is schematically shown in FIG. 7. Light source images corresponding to the combined luminous flux are formed in each transmission lens. As the size and luminance of the light source images correspond to the solid angle and light intensity of luminous fluxes incident on small lenses corresponding to the first lens array from the light source sections, they change in accordance with the positions of the transmission lenses in the second lens array. Although, in FIG. 7, in order to facilitate understanding, three kinds of light source image are depicted correlated to the luminous fluxes from the three light source sections 1, 2a and 2b, actually, light source images corresponding to the individual light source sections are overlapped into one light source image which is elongated in a direction of the X axis, except for in a periphery of the second lens array (distant from the illumination optical axis L).

That is, when viewing the second lens array 16 from the light source side, the light source image obtained from the luminous flux from the second light source section 2a is formed slightly to the left side (in a −X direction) of each transmission lens, the light source image obtained from the luminous flux from the first light source section 1 is formed in the central portion of each transmission lens, and the light source image obtained from the luminous flux from the second light source section 2b is formed slightly to the right side (in a +X direction) of each transmission lens. Herein, as the size and luminance distribution of the light source images formed reflect the intensity distribution of the lights passing through the second lens array 16, in a light source image group formed by the luminous flux from the second light source section 2a, the illumination optical axis a of which is shifted to the left side of the illumination optical axis L, a light source image having the highest luminance is formed on the left side (in a position G2a) of the illumination optical axis L. In the same way, in a light source image group formed by the luminous flux from the second light source section 2b, a light source image having the highest luminance is formed on the right side (in a position G2b) of the illumination optical axis L. In a light source image group formed by the luminous flux from the first light source section 1, a light source image having the highest luminance is formed on the illumination optical axis L (in a position G1).

The plurality of partial luminous fluxes emitted from the second lens array 16, a traveling direction of which is changed by the superimposing lens 17, pass through the parallelizing lens 18, and are incident on the light valve 11 which is the illumination object. Then, a light modulated by the light valve 11 is incident on the projection lens 13 (a projection system) as a projection light, and is transmitted onto a screen 20. By using appropriately decentered transmission lenses for the second lens array, it is possible to omit the superimposing lens.

Herein, the second lens array 16 and the pupil surface inside the projection lens 13 are in an approximately conjugate relationship. For this reason, as schematically shown in FIG. 8, a light source image group corresponding to the light source image group formed in the second lens array 16 is formed on the pupil plane. FIG. 8 shows the case of viewing the pupil plane from the exiting side of the projection lens 13. Also, the cells defined by the broken lines virtually show the transmission lenses of the second lens array 16. Herein too, as the size and luminance distribution of the light source images formed reflect the intensity distribution of lights passing through the pupil plane position of the projection lens 13, the intensity distribution of the lights passing through the pupil plane largely becomes the kind of distribution shown in FIG. 9.

In general, the imaging performance of the projection lens is high in the vicinity of the projection optical axis, and decreases with distance from the projection optical axis. Herein, as the light intensity on the projection optical axis L is highest, and the light intensity distribution is concentrated in the region approximately centered on the projection optical axis L, as will be appreciated from FIG. 9, according to the illumination apparatus 10 of the embodiment, it can be said that this realizes a light intensity distribution which is likely to achieve the intrinsic imaging performance of the projection lens, and unlikely to cause a display image degradation. Although the illumination optical axis L and the projection optical axis L are the same optical axis in origin, in the present specification, for the sake of convenience, the optical axis is referred to as the illumination optical axis on the illumination apparatus side, and as the projection optical axis on the projection lens side.

The pupil diameter of the projection lens 13 is desirably of a size encompassing all the light emitter images (light source images), and therefore, ideally the diameter of the circle shown by reference character T2 in FIG. 8. However, as will be appreciated from the fact that the nearer to the periphery of the projection optical axis L, the smaller the light emitter images (light source images), partial luminous fluxes passing through the periphery of the projection optical axis L have a low intensity. Consequently, in the event of setting the pupil diameter of the projection lens 13 to a pupil diameter corresponding to the diameter of the circle shown by reference character T1, it is possible to reduce the size and cost of the projection lens 13 while suppressing the light loss.

As heretofore described, according to the illumination apparatus 10 of the embodiment, by using the square truncated pyramid shaped reflector 3 when combining the lights from the plurality of light source sections 1, 2a and 2b, it is possible to attain the condition in which the illumination optical axes L, a and b of the plurality of light source sections 1, 2a and 2b are adjacent to each other. By this means, it being possible to form the combined light, which is to become the illumination light, with the lights from the light source sections 1, 2a and 2b adjacent to each other, and to dispose the highest intensity luminous flux in the approximate center of the combined light, it is possible to generate an illumination light for which the dispersion in angular distribution and intensity distribution is suppressed.

Also, according to the projector 100 utilizing this kind of illumination light, as the dispersion in angular distribution is suppressed, it is possible to realize a high light use efficiency. Also, as a large number of light source images formed on the pupil plane of the projection lens 13 concentrate in the region approximately centered on the projection optical axis L, and attain an approximately symmetric condition, and also, the dispersion in intensity distribution is also suppressed, it being easy to achieve the intrinsic imaging performance of the projection lens, it is possible to realize a display image superior in uniformity with small luminance and color variations. Furthermore, even in the event that one or two light source sections are turned off, it not happening that large luminance variations occur, it is possible to improve usability.

Although a projector including three light source sections has been illustrated in the embodiment, in the case of using the square truncated pyramid shaped reflector 3 of the embodiment, it being possible to dispose two more second light source sections in a direction of the Y axis, it is possible to convert lights from a total of five light source sections into lights traveling in the Z direction. Needless to say, the number of reflecting surfaces formed on the side surfaces of the reflector is not limited to four. For example, it is sufficient to use a hexagonal truncated pyramid shaped reflector in the case in which the number of light source sections not positioned on the illumination optical axis L is six, and an octagonal truncated pyramid shaped reflector in the case in which the number of light source sections is eight. Also, in the case of making the number of light source sections larger than three in the embodiment, it is desirable that at least a majority of the light source sections are disposed in a plane including the long edge of the light valve 11 and the illumination optical axis L.

Second Embodiment

Hereafter, a description will be given of a second embodiment of the invention, referring to FIG. 10.

Figure 10:
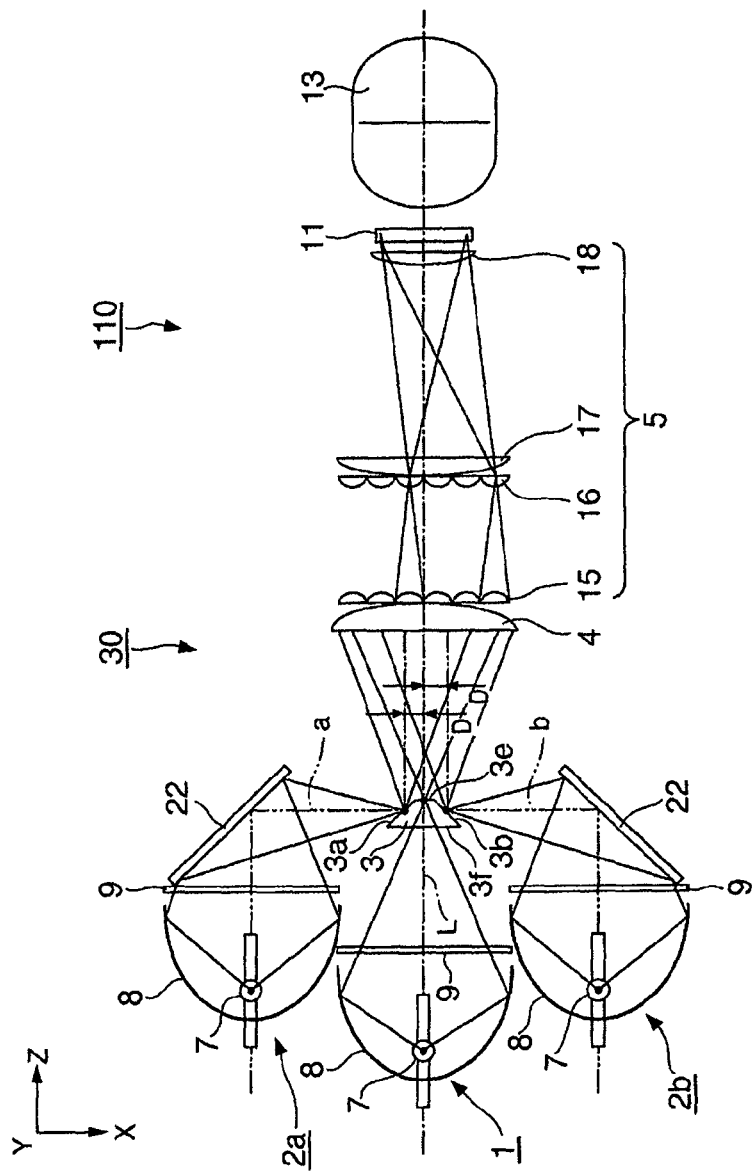
FIG. 10 shows one configuration example of a projector including an illumination apparatus of a second embodiment of the invention.

FIG. 10 shows a configuration example of a projector 110 including the illumination apparatus according to some aspects of the invention. In FIG. 10, identical reference characters being given to components common to those of FIG. 1 of the first embodiment, a detailed description will be omitted.

An illumination apparatus 30 of this embodiment differs from the illumination apparatus of the first embodiment (FIG. 1) in that, the two second light source sections 2a and 2b not positioned on the illumination optical axis L being disposed one on each side and adjacent to the first light source section 1, lights from the second light source sections 2a and 2b are each reflected by reflecting mirrors 22 (second light source section optical axis conversion elements), and led to the square truncated pyramid shaped reflector 3. It is also acceptable that the two second light source sections 2a and 2b are disposed in such a way that the illumination optical axes a and b of the second light source sections 2a and 2b are parallel to the illumination optical axis L of the first light source section 1, and it is also acceptable that the illumination optical axes a and b of the second light source sections 2a and 2b are not necessarily disposed parallel to the illumination optical axis L of the first light source section 1.

As the reflecting mirrors 22, it is desirable to use a dichroic mirror (a cold mirror) which transmits unnecessary ultraviolet light and infrared light, and reflects only necessary light. By this means, it being possible to suppress a heat generation in the square truncated pyramid shaped reflector 3, each kind of lens, and the like, it is possible in some cases to eliminate the need for the UV/IR cut filters 9 on the exiting sides of the light source sections 2a and 2b.

Also, as it is possible, by interposing the reflecting mirrors 22, to align the disposition directions of the three light source sections 1, 2a and 2b, by installing cooling apparatus on single sides of the three light source sections 1, 2a and 2b (for example, on the back sides of the reflectors 8), it is possible to align directions in which cooling air flows. By this means, the flow of cooling air becoming smooth, it is possible to realize a miniaturization of the cooling apparatus, an improvement in cooling efficiency, a noise reduction of a fan or the like at a cooling time, and the like. Needless to say, it is also acceptable to adopt a configuration wherein the lights from the first light source section 1 positioned on the illumination optical axis L, as well as those from the second light source sections 2a and 2b not positioned on the illumination optical axis L, are reflected by the reflecting mirrors.

Third Embodiment

Hereafter, a description will be given of a third embodiment of the invention, referring to FIGS. 11 to 13.

Figure 11:
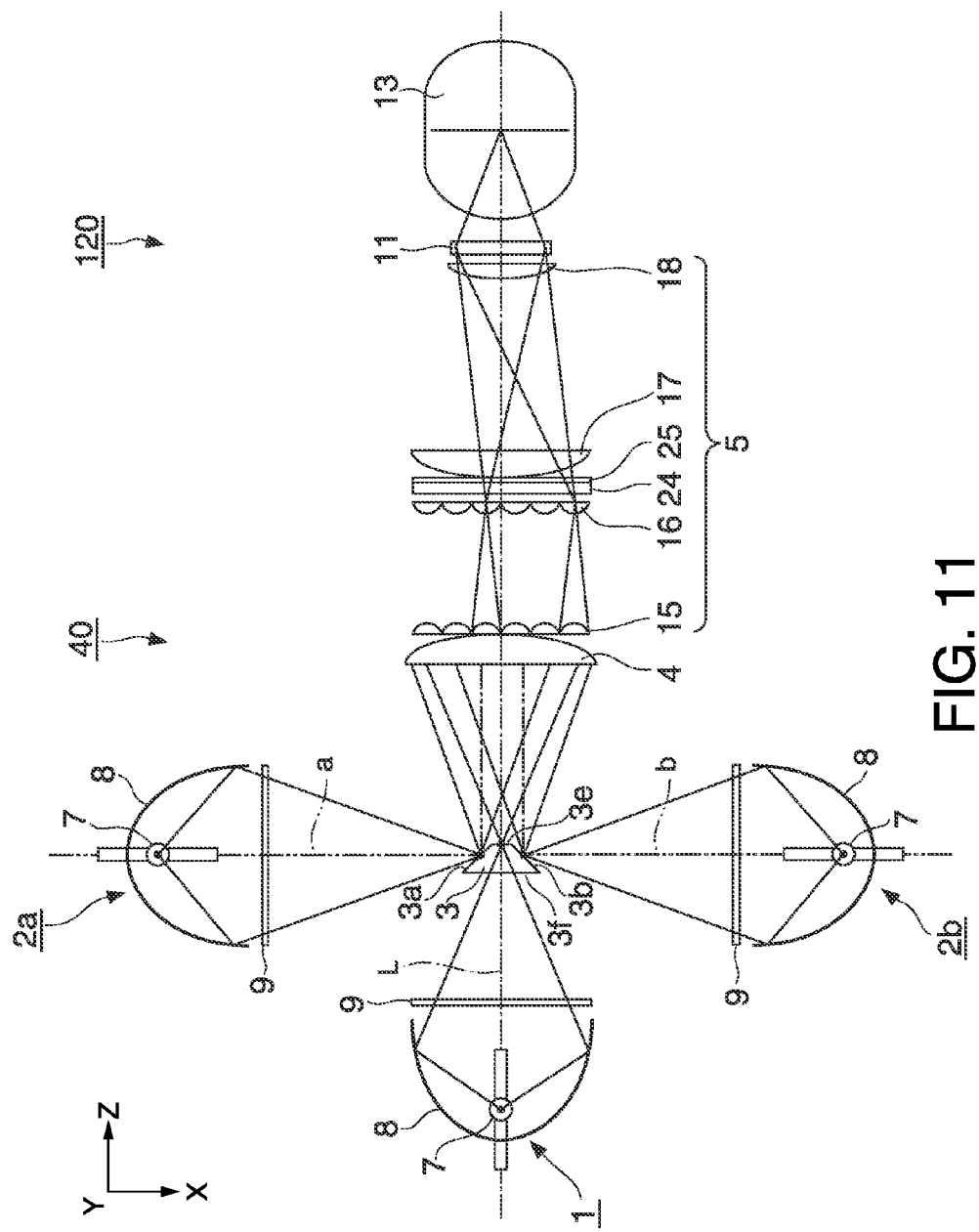
FIG. 11 shows one configuration example of a projector including an illumination apparatus of a third embodiment of the invention.

FIG. 11 shows a configuration example of a projector 120 including the illumination apparatus according to some aspects of the invention. In FIG. 11, identical reference characters being given to components common to those of FIG. 1 of the first embodiment, a detailed description will be omitted.

An illumination apparatus 40 of this embodiment differs from the illumination apparatus 1 of the first embodiment (FIG. 1) in including a polarizing light conversion system. The polarizing light conversion system is composed of a polarizing light separation prism array 24 (a PBS array) and a ½ wave plate 25. As the polarizing light conversion system is a heretofore known technology (including the relationship with the size of the transmission lenses of the second lens array), a detailed description of the polarizing light conversion system being omitted, a description will be given of the relationship between the light source sections and a polarizing light separation direction.

Figure 12:
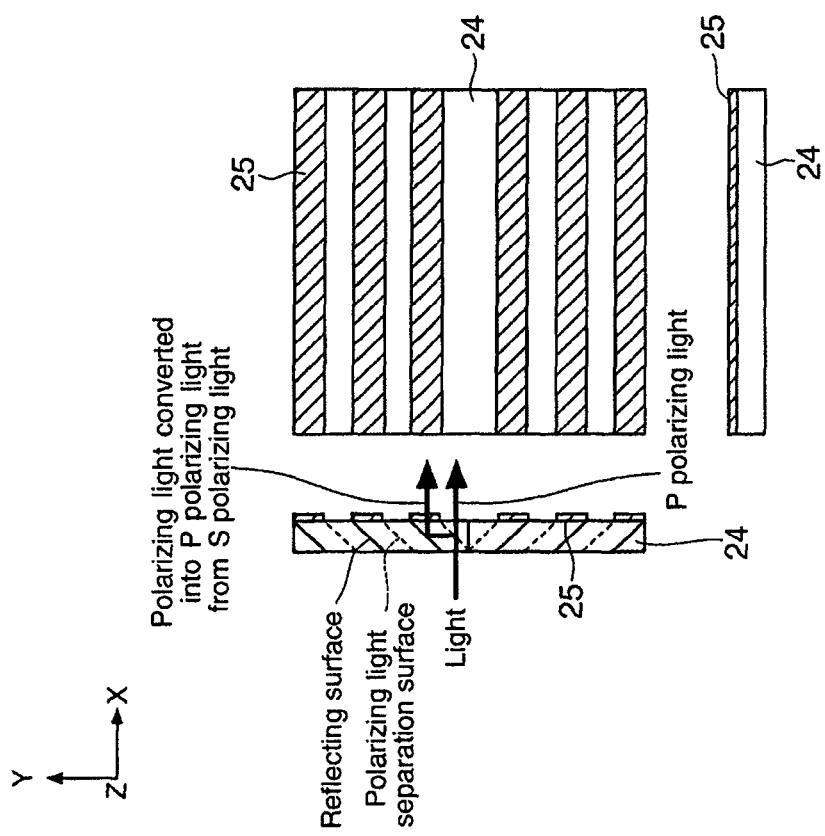
FIG. 12 shows a configuration example of a PBS array and ½ wave plate of the illumination apparatus.

A configuration example of the polarizing light separation prism system 24 (PBS array) and ½ wave plate 25 is shown in FIG. 12. Herein, the polarizing light separation direction (or a direction in which a pair of polarizing light separation surfaces and a reflecting surface are arranged) in the polarizing light separation prism system 24 is set to a direction perpendicular to a plane in which the three light source sections 1, 2a and 2b are disposed (or a direction perpendicular to a direction in which the luminous fluxes from the light source sections 1, 2a and 2b are combined). In the event that the number of light source sections is larger than three, it is desirable that the polarizing light separation direction in the polarizing light separation prism array 24 is set to a direction perpendicular to a plane in which at least a majority of the light source sections are disposed.

The combined luminous flux emitted from the combining lens 4 is converted into approximately one kind of polarized luminous flux by the polarizing light conversion system, and is incident on the light valve 11 which is the illumination object. When using a liquid crystal display device, for which it is necessary to use polarization when displaying an image, as the light valve 11, the employment of the polarizing light conversion system is effective from the point of view of being able to improve the light use efficiency.

Figure 13:
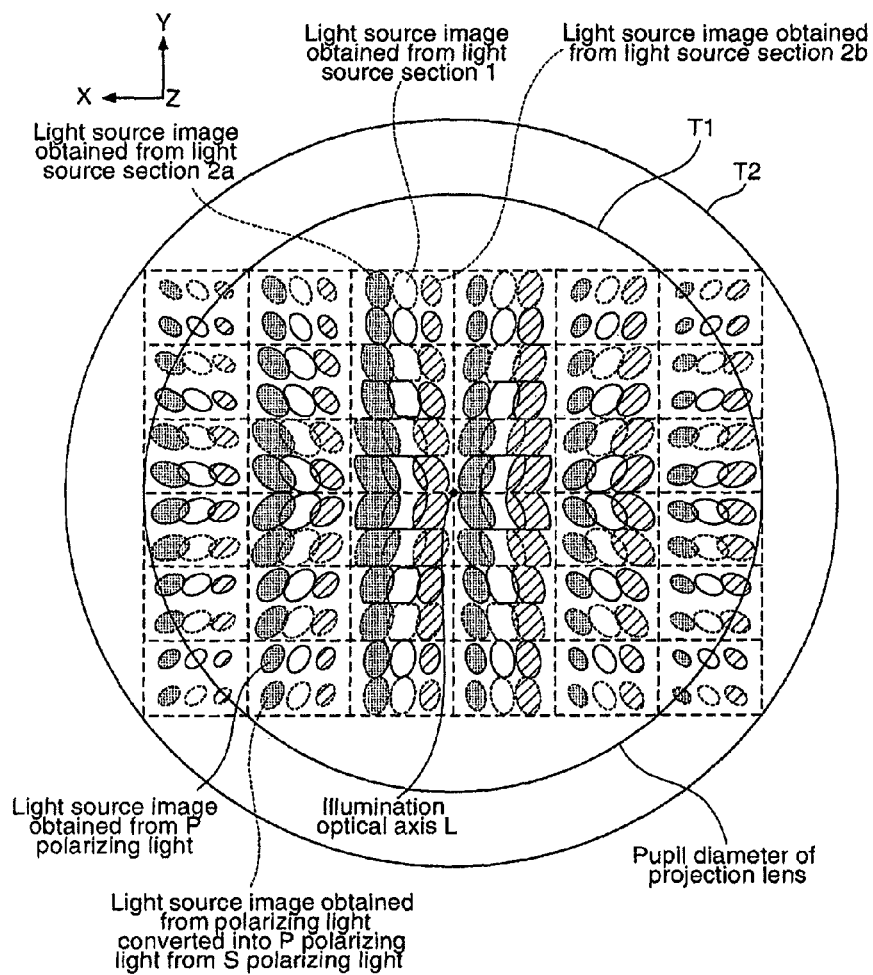
FIG. 13 shows a light source image formation condition on the pupil plane of the projection lens.

Herein, a light source image group formation condition on the pupil plane of the projection lens 13 is schematically shown in FIG. 13. FIG. 13 shows the case of viewing the pupil plane from the exiting side of the projection lens 13. The cells defined by the broken lines virtually show the transmission lenses of the second lens array 16. As the light emitter images (light source images) corresponding to the light source sections 1, 2a and 2b, light emitter images (light source images obtained from P polarizing lights) obtained from polarizing lights transmitted through a polarizing light separation surface of the polarizing light separation prism array 24, and light emitter images (light source images obtained from polarizing lights converted into the P polarizing lights from S polarizing lights) obtained from polarizing lights, reflected by the same polarizing light separation surface, a polarization direction of which has been converted by the ½ wave plate 25, are formed in pairs, on the pupil plane, in a polarizing light separation direction (a Y direction).

With the polarizing light conversion system using the polarizing light separation prism array 24, it is necessary to spatially further separate the partial luminous fluxes generated by the first lens array 13 from one another depending on a difference in polarization direction. Meanwhile, with the illumination apparatus 40 according to this embodiment, as shown in FIG. 13, a plurality of kinds of partial luminous flux corresponding to the number of light source sections 1, 2a and 2b are formed aligned in a direction in which the luminous fluxes from the individual light source sections 1, 2a and 2b are combined. In FIG. 13, in order to facilitate understanding, three kinds of partial luminous flux are depicted separated from one another. For this reason, in the event that the direction of the polarizing light separation by the polarizing light separation prism array 24 is set to a direction perpendicular to the luminous flux combination direction, as heretofore described, as partial luminous fluxes generated based on the number of light source sections, and partial luminous fluxes (refer to FIG. 13) generated by polarizing and separating them, can be rendered adjacent to each other the shading of partial luminous fluxes in the second lens array 16 and the polarizing light separation prism array 24 being reduced, it is possible to improve the light use efficiency.

As heretofore described, according to the illumination apparatus 40 of this embodiment, in addition to the effect obtained in the illumination apparatus according to the first embodiment, as it includes the polarizing light conversion system which converts unpolarizing lights emitted from the light source sections 1, 2a and 2b into lights having a specific polarizing condition, it is possible to realize a very high light use efficiency in an illumination apparatus or projector which includes a liquid crystal display device for which it is necessary to use polarizing lights. Also, as the polarizing light separation direction in the polarizing light conversion system is appropriately set in consideration of the disposition relationship of the plurality of light source sections 1, 2a and 2b, it is possible to realize a high light use efficiency.

The technological scope of the invention not being limited to the heretofore described embodiments, it is possible to make various modifications without departing from the scope of the invention. For example, in the heretofore described embodiments, the square truncated pyramid shaped reflector has been illustrated as the reflector but, without necessarily being limited to the square truncated pyramid shaped reflector, the outer shape does not have to be the polygonal truncated pyramid as long as the reflector has the function of transmitting the light from the first light source section 1 onto the illumination optical axis L and reflecting the lights from the second light source sections in approximately the same direction as that of the light from the first light source section. For example, it is also acceptable that one portion of the curved side surface of a circular truncated cone is notched, forming a flat surface, and the flat surface is made a reflecting surface.

Also, the first light source section 1 does not always have to be disposed on the illumination optical axis L. For example, it is also acceptable that a deviation prism 131 (a first light source section optical axis conversion element) is adjacently disposed on the light incident side of a reflector 3 which is the same as those of the heretofore described embodiments, as shown in FIG. 14A. In this case, although not shown in FIG. 14A, the first light source section 1 is disposed in a position away from the illumination optical axis L, with an illumination optical axis c of the first light source section 1 tilted from the illumination optical axis L, in such a way that the illumination optical axis L and the illumination optical axis c of the first light source section 1 intersect at an angle of other than 90 degrees. In this configuration, the tilt of the illumination optical axis c of the first light source section 1 from the illumination optical axis L is set in such a way that the light from the first light source section 1, after being refracted when being incident on an incident end face 131a of the deviation prism 131, is emitted from the reflector 3 along the illumination optical axis L. By this means, the light from the first light source section 1 travels parallel to the illumination optical axis L in approximately the same direction as that of the lights from the two second light source sections 2a and 2b, and these lights are combined into approximately one light.

Figure 14B:
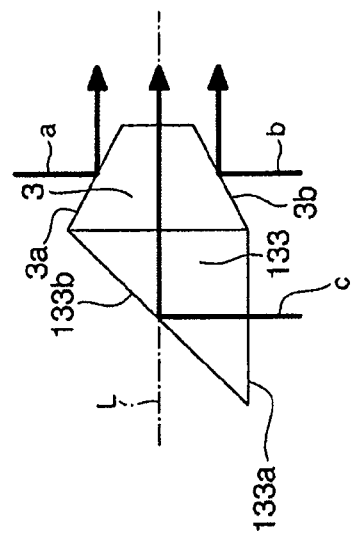
FIGS. 14A and 14B show other configuration examples of the reflector.
Figure 14A:
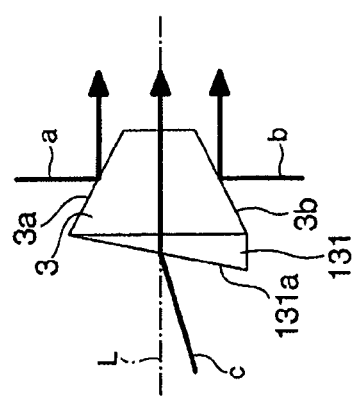

Alternatively, it is also acceptable that a reflecting prism 133 (the first light source section optical axis conversion element) is adjacently disposed on the light incident side of a reflector 3 which is the same as those of the heretofore described embodiments, as shown in FIG. 14B. In this case, for example, the first light source section 1 is disposed in such a way that the illumination optical axis L and the illumination optical axis c of the first light source section 1 intersect at approximately right angles. In this configuration, the light from the first light source section 1 is transmitted through an incident end face 133a of the reflecting prism 133 and, after being reflected by a total reflecting surface 133b, is emitted from the reflector 3 along the illumination optical axis L. By this means, the light from the first light source section 1 travels parallel to the illumination optical axis L in approximately the same direction as that of the lights from the two second light source sections 2a and 2b, and these lights are combined into approximately one light.

It is also acceptable to adopt a configuration wherein the illumination optical axis L and the illumination optical axis c intersect at an angle of other than right angles. The light incident on the reflecting prism causes a total reflection in the event that an angle of incidence on the total reflecting surface 133a fulfills total reflection conditions. For this reason, it is preferable to set the shape of the reflecting prism 133 and the disposition of the illumination optical axis c in such a way that the angle of incidence is increased to cause the total reflection.

According to the configurations of FIGS. 14A and 14B, as the first light source section 1 does not have to be disposed on the illumination optical axis L, the degree of freedom in the disposition place of the first light source section 1 being improved, it is possible in some cases to reduce a dimension of the illumination apparatus in a direction along the illumination optical axis L.

In the configuration of FIG. 14B, it is also acceptable to dispose a reflecting mirror in the position of the total reflecting surface 133b of the reflecting prism 133, in place of installing the reflecting prism 133 on the light incident side of the reflector 3. In this case too, it is possible to obtain the same advantage as heretofore described.

Also, in the heretofore described embodiments, as the optical axis conversion element, an example of the reflector has been given in which the lights from the plurality of second light source sections are surface reflected by a side surface on which they are incident first, and the direction of the optical axis thereof is converted into a direction parallel to the illumination optical axis, but this configuration is not limiting. For example, it is also acceptable to use an optical axis conversion element wherein the lights from the plurality of second light source sections, after being transmitted though a side surface on which they are incident first, are totally reflected by another side surface, and the direction of the optical axis thereof is converted into a direction parallel to the illumination optical axis. Alternatively, it is also acceptable to use an optical axis conversion element wherein the lights from the plurality of second light source sections are refracted inside, and the direction of the optical axis thereof is converted into a direction parallel to the illumination optical axis.

Hereafter, a description will be given of embodiments reflecting these configurations.

Fourth Embodiment

Hereafter, a description will be given of a fourth embodiment of the invention, referring to FIGS. 15 to 17.

Figure 15:
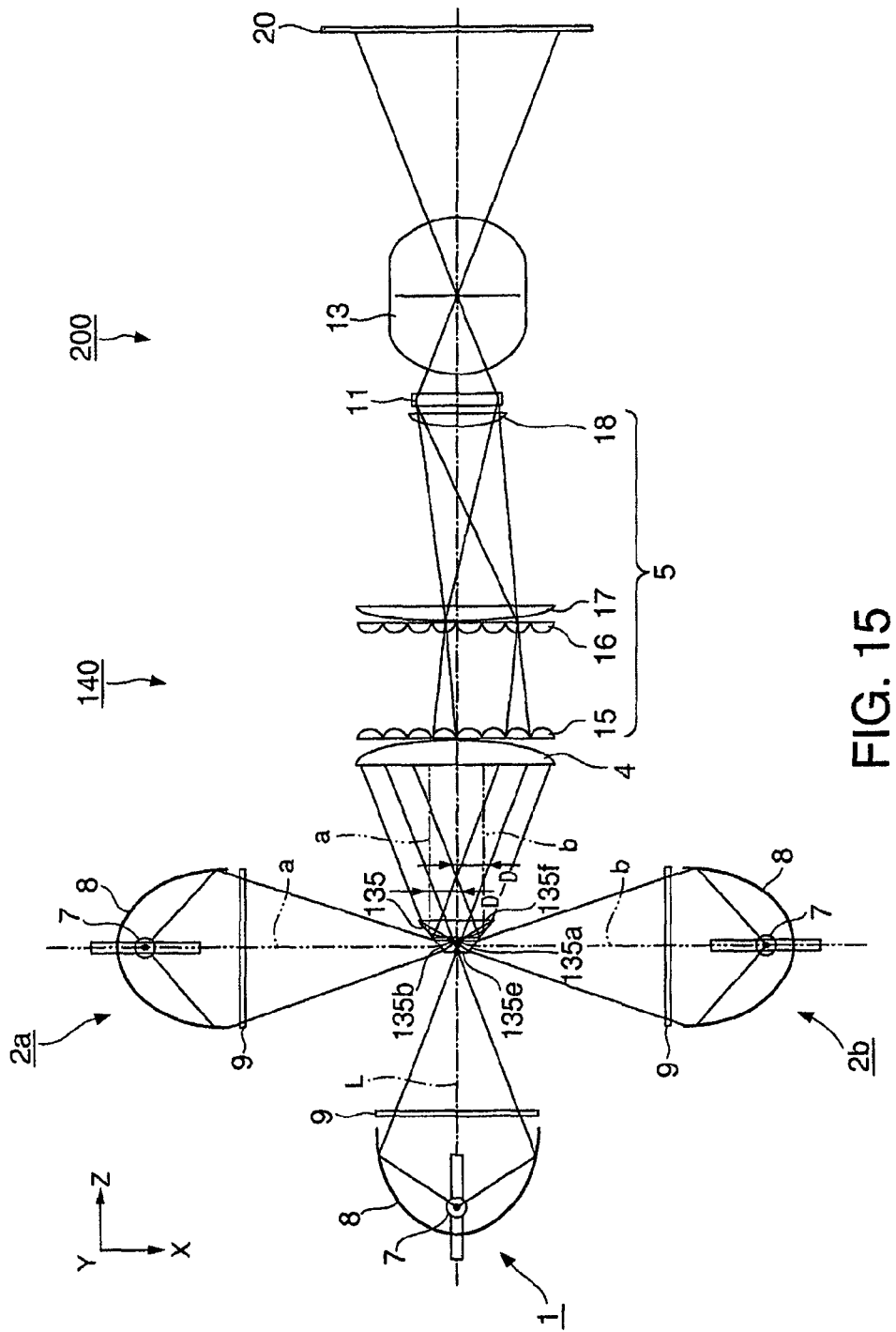
FIG. 15 shows one configuration example of a projector including an illumination apparatus of a fourth embodiment of the invention.

FIG. 15 shows a configuration example of a projector including the illumination apparatus according to some aspects of the invention. The overall configuration of the projector shown in FIG. 15 being approximately common to that of the projector of the first embodiment shown in FIG. 1, the main difference is in the configuration of an optical axis conversion element of the illumination apparatus. Consequently, in FIG. 15, identical reference characters being given to components common to those of FIG. 1 of the first embodiment, a detailed description will be omitted.

Figure 16A:
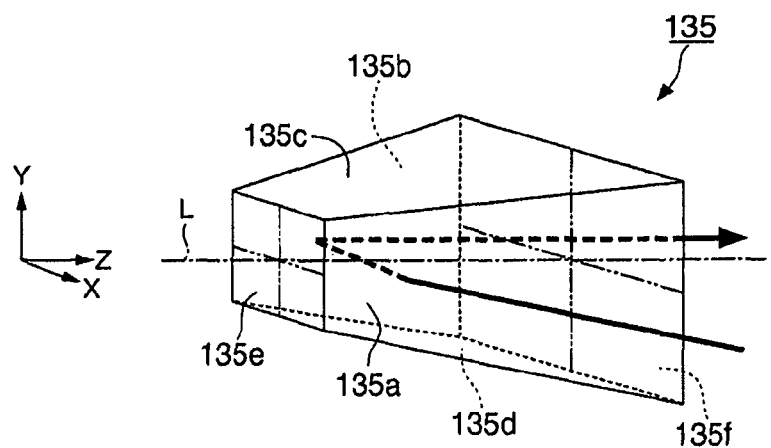
FIGS. 16A and 16B show a configuration example of an optical axis conversion element used in the illumination apparatus of this embodiment.
Figure 16B:
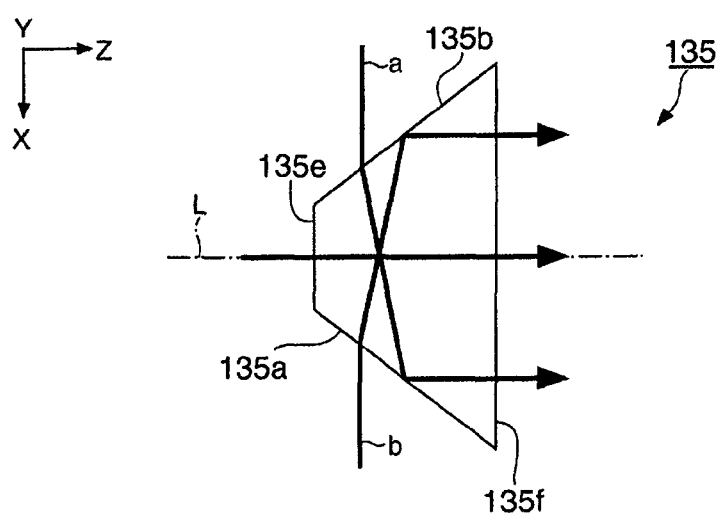

FIGS. 16A and 16B show an optical axis conversion element 135 used in an illumination apparatus 140 of this embodiment. As shown in the figures, the optical axis conversion element 135 of this embodiment is a solid transparent body made of a light transmissive material such as glass, resin or crystal. The optical axis conversion element 135 has a square truncated pyramid shape, and an antireflection coating formed of a dielectric multilayer or the like is formed on all six surfaces 135a to 135f. The optical axis conversion element 135 having two transmissive end faces, a small transmissive end face 135e having a relatively small area is disposed on the side near to the first light source section 1, and a large transmissive end face 135f having a relatively large area is disposed on the side far from the first light source section 1. The small transmissive end face 135e and the large transmissive end face 135f, being in a disposition relationship in which they are parallel to each other, configure a pair of parallel planes approximately perpendicular to the illumination optical axis L. Also, four side surfaces 135a to 135d are disposed in such a way as to form a predetermined angle with an axis passing through the approximate center of the optical axis conversion element 135. In other words, each side surface 135a to 135d is disposed tilted in such a way that the normal line of each side surface 135a to 135d intersects the illumination optical axis L on the exiting side of the optical axis conversion element 135 (on the projection lens 13 side of the small transmissive end face 135e).

As shown in FIG. 15, the light from the first light source section 1 positioned on the illumination optical axis L is incident from the small transmissive end face 135e, and is emitted from the large transmissive end face 135f along the illumination optical axis L without changing the traveling direction. Meanwhile, the lights from the second light source sections 2a and 2b not positioned on the illumination optical axis L, as shown in FIG. 16B, are incident from the side surfaces 135a and 135b positioned on the illumination optical axes a and b of the second light source sections 2a and 2b, and are refracted when being incident, slightly changing the traveling direction. Then, the lights from the second light source sections 2a and 2b, after being totally reflected by the side surfaces 135b and 135a facing the side surfaces 135a and 135b on which they have been incident, further greatly changing the traveling direction, are emitted from the large transmissive end face 135f in a direction parallel to the illumination optical axis L. In other words, the disposition relationship between the two side surfaces 135a and 135b and the illumination optical axes a and b of the second light source sections 2a and 2b is set in such a way that the lights from the second light source sections 2a and 2b are emitted from the large transmissive end face 135f in the direction parallel to the illumination optical axis L. By this means, the lights from the plurality of light source sections 1, 2a and 2b which have been incident on the optical axis conversion element 135 from differing directions are emitted from one large transmissive end face 135f in approximately one direction along the illumination optical axis L in a condition in which they are adjacent to each other, and combined into approximately one light on the illumination optical axis L.

With the optical axis conversion element 135, only a light, among lights incident from the side surface 135a, whose angle of incidence on the side surface 135b fulfills the total reflection conditions, is totally reflected by the side surface 135b. In the same way, only a light, among lights incident from the side surface 135b, whose angle of incidence on the side surface 135a fulfills the total reflection conditions, is totally reflected by the side surface 135a. The higher the refractive index of the transparent body configuring the optical axis conversion element 135 is, the smaller the incidence angle causing the total reflection becomes, so it is desirable to form the optical axis conversion element 135 using a material having a high refractive index. In the event of making this kind of optical axis conversion element 135, as it is possible to reduce the angles formed by the illumination optical axis L and the side surfaces 135a and 135b, it is possible to reduce the dimensions (particularly the dimension in the X direction) of the optical axis conversion element 135.

With the optical axis conversion element 135, it being necessary to include at least the same number of side surfaces as the number of second light source sections 2a and 2b not positioned on the illumination optical axis L, it is possible to combine lights from three or more light source sections as a whole. Also, the optical axis conversion element 135 of this embodiment is suitable for a configuration of combining lights from an odd number (in this embodiment, three) of light source sections. That is, with the configuration of the optical axis conversion element 135 of this embodiment, as it is possible to make all the shapes of the side surfaces 135a to 135d the same, it is comparatively easy to process the element. Also, for the combined light, as a light having a high spatial symmetry of angular distribution or intensity distribution is easier to utilize, from this point of view, it is desirable that the number of corresponding light source sections is an odd number. For example, the optical axis conversion element 135 of this embodiment shown in FIG. 16A can be utilized even in the case of combining luminous fluxes from five light source sections. In this case, it being sufficient to dispose four second light source sections in symmetrical positions centered on the illumination optical axis L, it is easy to dispose the light source sections.

Figure 17:
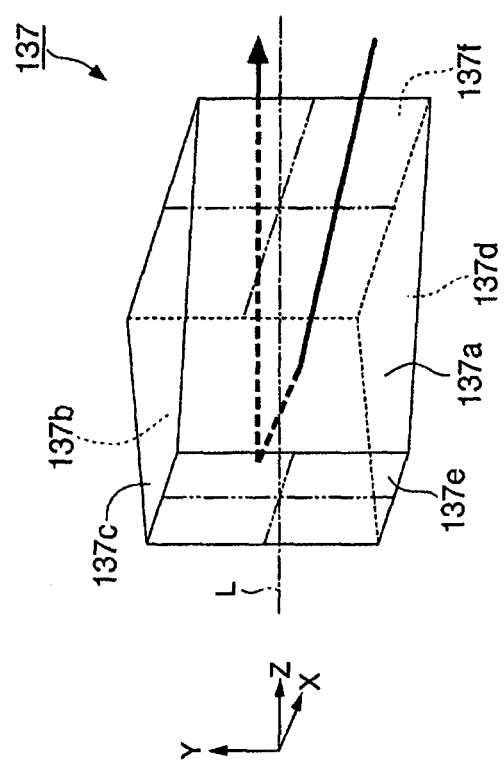
FIG. 17 shows another configuration example of the optical axis conversion element.

Also, in the event of simply combining luminous fluxes from three light source sections, as in this embodiment, it is also acceptable to adopt a configuration wherein side surfaces 137*a* and 137*b* on which luminous fluxes from the light source sections are incident are increased in size in comparison with side surfaces 137*c* and 137*d* on which the luminous fluxes from the light source sections are not incident, and a dimension of a small transmissive end face 137*e* in the Y direction is made to conform to a dimension of a large transmissive end face 137*f* in the Y direction, as shown in FIG. 17. In this case, as an optical axis conversion element 137 is of a shape having two pairs of parallel planes facing each other, it is easy to process the element. Also, to focus attention on the heating of the optical axis conversion element, as the optical axis conversion element 137 shown in FIG. 17 has a larger surface area than the optical axis conversion element 135 shown in FIG. 16A, it being easy to dissipate heat, it is possible to improve the heat resistance.

Next, a description will be given, using FIG. 15, of the installation position of the optical axis conversion element 135.

As the luminous fluxes from the light source sections 1, 2*a* and 2*b* diverge after converging and forming a light emitter image (a collected light spot), it is desirable to use the optical axis conversion element 135 at the stage at which the luminous flux diameter is small. From this point of view, it is desirable that two collected light spots obtained from the two second light source sections 2*a* and 2*b* not positioned on the illumination optical axis L are formed inside the optical axis conversion element 135, while a collected light spot obtained from the first light source section 1 positioned on the illumination optical axis L is formed in as immediate a vicinity of the small transmissive end face 135*e* of the optical axis conversion element 135 as possible, and that the optical axis conversion element 135 is disposed in the kind of position in which the optical distances from the collected light spots and the combining lens 4 coincide as much as possible. Also, the sizes of the small transmissive end face 135*e*, large transmissive end face 135*f*, and side surfaces 135*a* to 135*d* are set to dimensions equal to or greater than the luminous flux diameter in such a way as not to block luminous fluxes incident on them. By means of this kind of disposition and configuration, it being possible to increase the efficiency at the stage of generating the combined luminous flux, it is possible to reduce the dispersion in angular distribution of the combined luminous flux.

In a projector 200 of this embodiment too, as the dispersion in angular distribution of a light emitted from an illumination apparatus 140 is suppressed, it is possible to obtain the same advantage as that of the heretofore described embodiment in that it is possible to realize a high light use efficiency. Also, in the case of using the optical axis conversion element 135 including the function of changing the traveling direction of the light by utilizing the total reflection, as in this embodiment, although a light loss occurs due to an extremely slight light reflection in an end surface on the side on which the light is incident, little light loss occurs in a side surface on which the total reflection occurs. For this reason, in the event that the light absorption of the transparent body configuring the optical axis conversion element 135 is extremely slight, it hardly ever happens that the optical axis conversion element 135 is heated. Therefore, even in the event of causing a very strong light to be incident, it is possible to maintain a high durability over a long period.

In this embodiment, in the case in which the lights from the second light source sections 2*a* and 2*b* are incident along the normal lines of the side surfaces 135*a* and 135*b* of the optical axis conversion element 135, no refraction occurs when the lights are incident on the side surfaces 135*a* and 135*b* of the optical axis conversion element 135, and the traveling direction does not change in the side surfaces 135*a* and 135*b*. It is also acceptable that the second light source sections 2*a* and 2*b* and the optical axis conversion element 135 are in this kind of positional relationship. Also, in the case of this embodiment too, it is also acceptable to adopt a configuration wherein the kinds of deviation prism and reflecting prism shown in FIGS. 14A and 14B are installed on the incident side of the optical axis conversion element 135, and the first light source section 1 is not disposed on the illumination optical axis L.

Fifth Embodiment

Hereafter, a description will be given of a fifth embodiment of the invention, referring to FIGS. 18, 19A and 19B.

Figure 18:
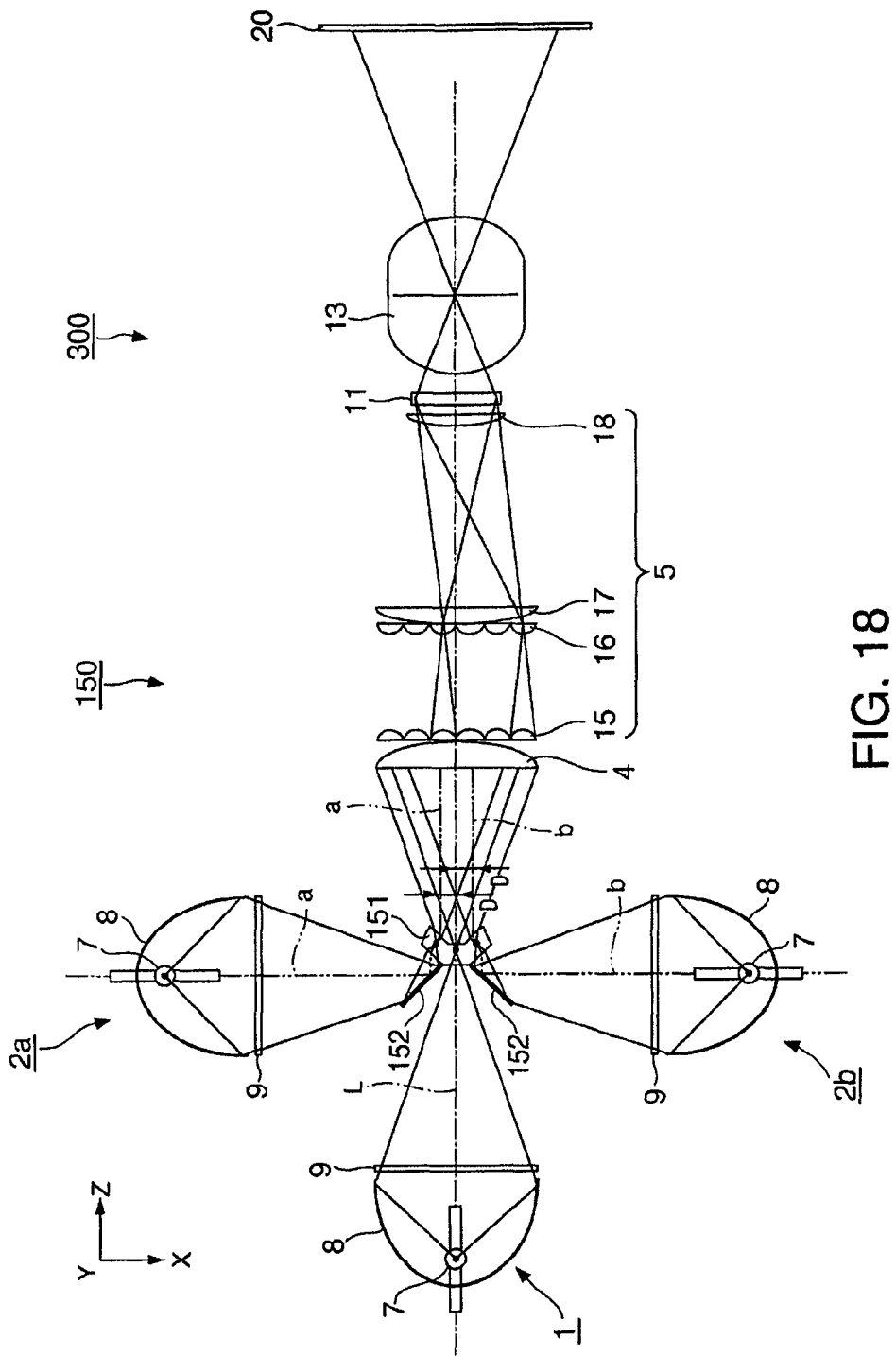
FIG. 18 shows one configuration example of a projector including an illumination apparatus of a fifth embodiment of the invention.

FIG. 18 shows a projector 300 including an illumination apparatus 150 according to some aspects of the invention. FIGS. 19A and 19B showing a configuration of an optical axis conversion element 151 used in this embodiment, FIG. 19A is a perspective view, while FIG. 19B is a plan view.

The overall configuration of the projector shown in FIG. 18 being approximately common to that of the projector of the first embodiment shown in FIG. 1, the main difference is in the configuration of the optical axis conversion element of the illumination apparatus. Consequently, in FIG. 18, identical reference characters being given to components common to those of FIG. 1 of the first embodiment, a detailed description will be omitted.

Figure 19A:
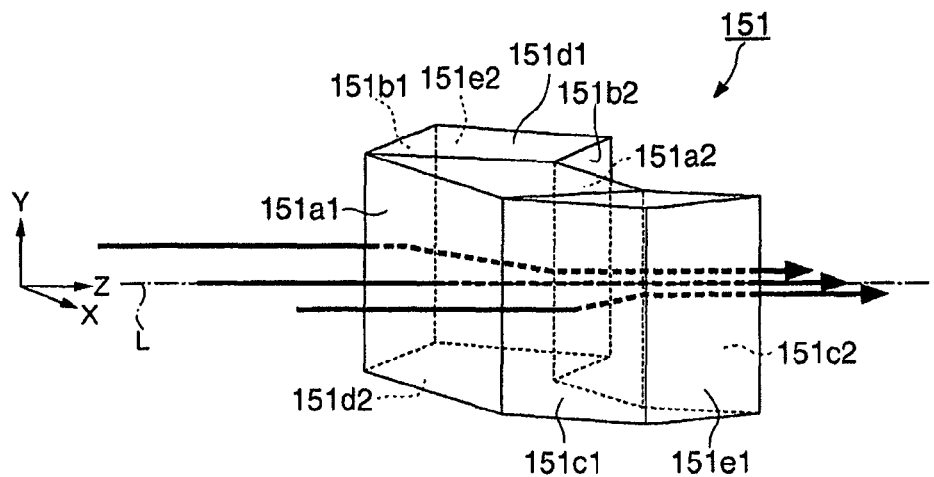
FIGS. 19A and 19B show a configuration example of an optical axis conversion element used in the illumination apparatus of this embodiment.
Figure 19B:
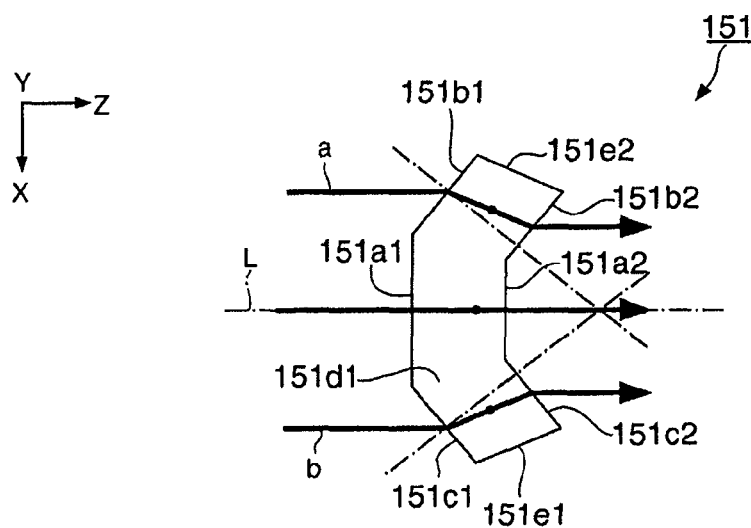

The optical axis conversion element 151 of this embodiment is configured of an optical element which refracts an incident light inside, and converts and emits an optical axis position, as shown in FIGS. 19A and 19B. Also, as shown in FIG. 18, reflecting mirrors 152 (the second light source section optical axis conversion elements) are installed on the light incident side of the optical axis conversion element 151. The reflecting mirrors 152 are for reflecting the lights from the second light source sections 2*a* and 2*b*, bending the optical axes thereof, and causing them to be incident on the optical axis conversion element 151. With this embodiment, the degree of freedom in the installation places of the second light source sections 2*a* and 2*b* is increased by adopting a configuration wherein the lights from the second light source sections 2*a* and 2*b* are caused to be incident on the optical axis conversion element 151 via the reflecting mirrors 152. Consequently, the reflecting mirrors 152 do not always have to be used in the event that it is possible to dispose the first light source section 1 and the two second light source sections 2*a* and 2*b* without physically interfering with each other.

Hereafter, a description will be given of the optical axis conversion element 151.

The optical axis conversion element 151 of this embodiment is configured of a solid transparent body made of a light-transmissive material such as glass, resin or crystal, as shown in FIGS. 19A and 19B. The optical axis conversion element 151 has a total of ten surfaces, among which four surfaces 151*d*1, 151*d*2, 151*e*1 and 151*e*2 are surfaces which do not contribute to a light transmission. The remaining six surfaces 151a1, 151a2, 151b1, 151b2, 151c1 and 151c2 are three pairs of surfaces parallel to each other (parallel planes) coinciding with the number of light source sections 1, 2a and 2b. Hereafter, for the sake of facilitating the description, one pair of parallel planes formed of the surfaces 151a1 and 151a2 will be referred to as first parallel planes 151a, one pair of parallel planes formed of the surfaces 151b1 and 151b2 as second parallel planes 151b, and one pair of parallel planes formed of the surfaces 151c1 and 151c2 as second parallel planes 151c.

With the optical axis conversion element 151, the two pairs of second parallel planes 151b and 151c are formed one on either side of the one pair of first parallel planes 151a intersecting the illumination optical axis L at right angles. The two pairs of second parallel planes 151b and 151c are disposed tilted from the illumination optical axis L in such a way that the normal lines of the second parallel planes 151b and 151c intersect the illumination optical axis L on the exiting side of the optical axis conversion element 151. The first parallel planes 151a are configured of an incident end face 151a1 on which the light from the first light source section 1 is caused to be incident, and an exiting end face 151a2 from which the light from the first light source section 1 is emitted. The second parallel planes 151b and 151c are configured respectively of incident end faces 151b1 and 151c1 on which the lights from the second light source sections 2a and 2b are caused to be incident, and exiting end faces 151b2 and 151c2 from which the lights from the second light source sections 2a and 2b are emitted. Then, for these six surfaces 151a1, 151a2, 151b1, 151b2, 151c1 and 151c2, it is desirable that an anti-reflection coating is applied to the front surfaces thereof.

Herein, on lights incident on the parallel planes 151b and 151c from a direction away from the normal lines thereof, the lights make a parallel shift to the incident optical axes in a predetermined direction, and are emitted with the traveling direction at the time of incidence maintained. A direction in which the shift is made depends on a direction of the tilt of the parallel planes 151b and 151c from the illumination optical axis L, and a shift amount depends on the angle of incidence on the normal lines of the parallel planes 151b and 151c, the distance between two surfaces configuring the parallel planes 151b and 151c, and the refractive index of a material configuring the optical axis conversion element 151. Consequently, the luminous flux from the first light source section 1 positioned on the illumination optical axis L is incident along the normal line of the first parallel planes 151a, and is emitted along the illumination optical axis L without changing the traveling direction Meanwhile, the luminous fluxes from the second light source sections 2a and 2b not positioned on the illumination optical axis L, after being reflected by the reflecting mirrors 152, attain a condition in which the optical axes thereof are approximately parallel to the illumination optical axis L, and are incident from the incident end faces 151b1 and 151c1 of the second parallel planes 151b and 151c, then, the positions of the luminous fluxes are shifted toward the illumination optical axis L, and the luminous fluxes are emitted from the exiting end faces 511b2 and 151c2 in a direction parallel to the illumination optical axis L.

That is, by causing the luminous fluxes from the second light source sections 2a and 2b to pass through the second parallel planes 151b and 151c disposed at a predetermined angle to the illumination optical axis L, it is possible to bring the position of the collected light spot (as illustrated by a black dot), which is the secondary light source, closer to the illumination optical axis L. This is equivalent to the second light source sections 2a and 2b in positions physically distant from the first light source section 1 being disposed optically adjacent to the first light source section 1. By this means, the luminous fluxes from the plurality of light source sections 1, 2a and 2b, which have been incident on the optical axis conversion element 151, are emitted along the illumination optical axis L in approximately the same direction in the condition in which they are adjacent to each other, and combined into approximately one luminous flux on the illumination optical axis L.

In the projector 300 of this embodiment too, as the dispersion in angular distribution of a light emitted from the illumination apparatus 150 is suppressed, it is possible to obtain the same advantage as that of the heretofore described embodiments in that it is possible to realize a high light use efficiency.

In the optical axis conversion element 151 of this embodiment, the illumination optical axes a and b of the two second light source sections 2a and 2b are set parallel to the illumination optical axis of the first light source section 1 (that is, the illumination optical axis L) passing through the approximate center of the optical axis conversion element 151 at the point at which they are incident on the optical axis conversion element 151. For this reason, a configuration being adopted wherein the luminous fluxes from the two second light source sections 2a and 2b are reflected by the reflecting mirrors 152, and led to the optical axis conversion element 151, a configuration is adopted wherein a physical interference between the light source sections 1, 2a and 2b is unlikely to occur. As the reflecting mirrors 152 used herein, it is desirable to use a cold mirror which transmits unnecessary ultraviolet light and infrared light, and reflects only necessary visible light. By this means, it is possible to suppress a heat generation in the optical axis conversion element 151 and a subsequent optical element or the like. As a unit which changes the traveling direction of the luminous fluxes from the second light source sections 2a and 2b, it is also acceptable to use a reflecting prism which can utilize a total reflecting action, in place of the reflecting mirrors 152.

Also, as the luminous fluxes from the light source sections 1, 2a and 2b diverge after converging and forming light emitter images (collected light spots), it is desirable to use the optical axis conversion element 151 at the stage at which the luminous flux diameter is small. As the luminous flux incident on the optical axis conversion element 151, and the luminous flux exiting the optical axis conversion element 151, have finite dimensions, including the portions of the collected light spots, it is necessary to set the aperture dimensions of the incident end faces 151a1, 151b1 and 151c1, and exiting end faces 151a2, 151b2 and 151c2 in such a way as not to block these luminous fluxes. From this point of view, it is desirable to use the optical axis conversion element 151 in the kind of disposition in which the collected light spots obtained from the light source sections 1, 2a and 2b are formed inside the optical axis conversion element 151. Also, it is desirable to set the disposition of each light source section 1, 2a and 2b, and the convergence of the converging luminous fluxes from the light source sections 1, 2a and 2b, in such a way that the optical distances from the collected light spots formed by the light source sections 1, 2a and 2b to the combining lens 4 approximately coincide with each other. In the event of employing this kind of configuration, it being possible to increase the parallelity of the combined luminous flux, as well as reducing the luminous flux diameter, it is possible to increase the light use efficiency in the combining lens and a subsequent optical system.

Also, with the optical axis conversion element 151 of this embodiment, although the two second parallel planes 151b and 151c are disposed so as to be symmetrical centered on the illumination optical axis L, this disposition not being limiting, it is also acceptable that the two second parallel planes 151b and 151c are asymmetrically disposed. In this case, it is possible to increase the degree of freedom in the installation positions of the second light source sections 2a and 2b. Also, in this embodiment, the reflecting mirrors 152 are also disposed so as to be symmetrical with respect to the illumination optical axis L but, this disposition not being limiting, it also being acceptable that the two second parallel planes 151b and 151c are disposed asymmetrically correlated to the positions of the second light source sections 2a and 2b, it is also acceptable to provide them, for example, only on the optical axis of either one of the two second light source sections 2a and 2b.

Furthermore, in the optical axis conversion element 151 of this embodiment, a configuration has been adopted such as to combine the luminous fluxes from the three light source sections but, the number of light source sections not being limited to three, it is also acceptable that it is four or more. In this case, it is necessary to have a number of parallel planes (the second parallel planes 151b and 151c in this embodiment), the normal lines of which are disposed tilted from the illumination optical axis L, equal to or larger than the number of second light source sections not positioned on the illumination optical axis L. However, for the combined luminous flux, as a luminous flux having a high spatial symmetry of the angular distribution or intensity distribution is easier to utilize, it is desirable that the number of corresponding light source sections is an odd number.

Hereafter, a description will be given, using FIGS. 20 to 28, of optical axis conversion element modification examples applicable to the projectors of the heretofore described embodiments.

Figure 20:
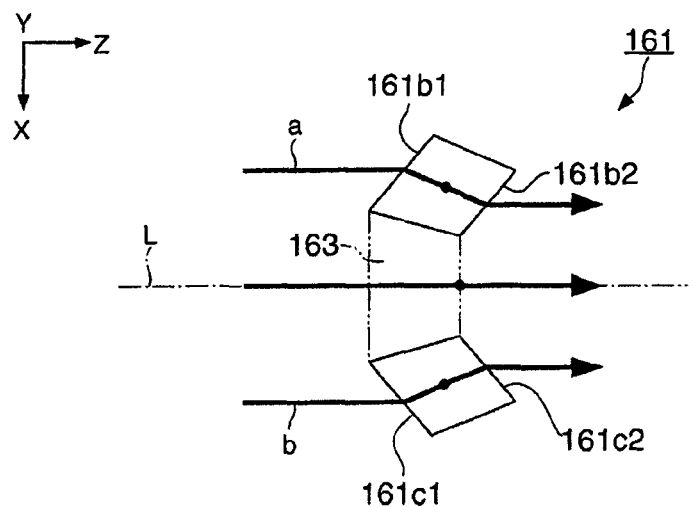
FIG. 20 shows another configuration example of the optical axis conversion element.

For example, in the event that, the first light source section 1 being disposed on the illumination optical axis L, there is no need to deviate the angle of the luminous flux from the first light source section 1, as shown in FIG. 20, it is also acceptable to use an optical axis conversion element 161 in which a portion of the optical axis conversion element 151 shown in FIG. 19B equivalent to the first parallel planes 151a which transmits the luminous flux from the first light source section 1 is removed to form a hollow portion 163 passing through in a direction in which the illumination optical axis L extends. The luminous fluxes from the second light source sections 2a and 2b are incident from surfaces 161b1 and 161c1, the positions of the luminous fluxes are shifted toward the illumination optical axis L, and the luminous fluxes are emitted from surfaces 161b2 and 161c2 in a direction parallel to the illumination optical axis L.

In this configuration, it is also acceptable to use an optical axis conversion element in which only the vicinity of a portion of the first parallel planes 151a of the optical axis conversion element 151 shown in FIG. 19B which transmits the luminous flux from the first light source section 1 is opened to form a hollow portion, and portions thereof which transmit the luminous fluxes from the second light source sections 2a and 2b are integrated, and it is also acceptable to use an optical axis conversion element in which all the first parallel planes 151a are removed to separate two portions which transmit the luminous fluxes from the second light source sections 2a and 2b. However, it is more desirable to use the former from the point of view of it being easy to handle the positioning of the optical axis conversion element with respect to the light source sections 1, 2a and 2b, or the like.

According to the optical axis conversion element 161 of this configuration, as the number of physical interfaces which transmit the luminous flux from the first light source section 1 decreases in comparison with the configuration of the optical axis conversion element 151 shown in FIGS. 19A and 19B, a light loss at the interfaces being reduced, it is possible to increase the light use efficiency in the optical axis conversion element 161.

Also, in the optical axis conversion element 151 shown in FIGS. 19A and 19B, the portions on which the luminous fluxes from the second light source sections 2a and 2b are incident are configured of the parallel planes but, in place of this configuration, it is also acceptable that the portions on which the luminous fluxes from the second light source sections 2a and 2b are incident are configured of a pair of surfaces nonparallel to each other (hereafter called nonparallel planes). For example, in an optical axis conversion element 171 shown in FIG. 21, the portion which transmits the luminous flux from the first light source section 1 is configured of parallel planes 171a formed of surfaces 171a1 and 171a2, and the portions which transmit the luminous fluxes from the second light source sections 2a and 2b are configured of nonparallel planes 171b and 171c, in which incident end faces 171b1 and 171c1 are made nonparallel to exiting end faces 171b2 and 171c2 respectively, in such a way that virtual lines of intersection between the incident end faces 171b1 and 171c1 and the exiting end faces 171b2 and 171c2 (in FIG. 21, shown by a point of intersection P, where the point of intersection P shows a point in an XZ plane of the line of intersection between the incident end face 171b1 and the exiting end face 171b2) are positioned on the side nearer to the illumination optical axis L.

Figure 21:
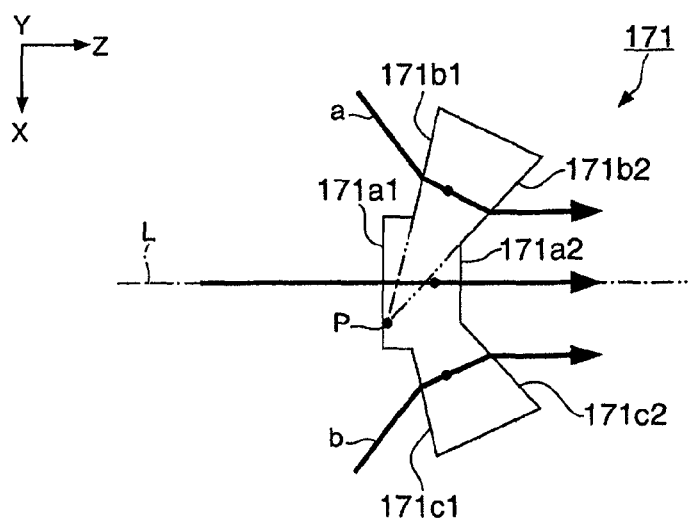
FIG. 21 shows another configuration example of the optical axis conversion element.

In the case of using the optical axis conversion element 171 shown in FIG. 21, the luminous flux from the first light source section 1 positioned on the illumination optical axis L passes through the parallel planes 171a, and is emitted along the illumination optical axis L, meanwhile, the luminous fluxes from the second light source sections 2a and 2b are refracted respectively by two interfaces between the incident end faces 171b1 and 171c1 and the exiting end faces 171b2 and 171c2, the optical axes of the luminous fluxes become parallel to the illumination optical axis L, and the luminous fluxes are emitted along the illumination optical axis L. By this means, it is possible to bring the positions of the collected light spots (as illustrated by a black dots), which are the secondary light sources of the second light source sections 2a and 2b, closer to the illumination optical axis L. As the illumination optical axes a and b of the second light source sections 2a and 2b can be bent more greatly in the case of this embodiment than in the case of using the optical axis conversion element in which the portions on which the luminous fluxes from the second light source sections 2a and 2b are incident are configured of the parallel planes, it is possible to increase the degree of freedom in the disposition of the second light source sections 2a and 2b. For this reason, it being possible to reduce the number of reflecting mirrors on the light incident side of the optical axis conversion element 171, it is possible to increase the light use efficiency.

Figure 22:
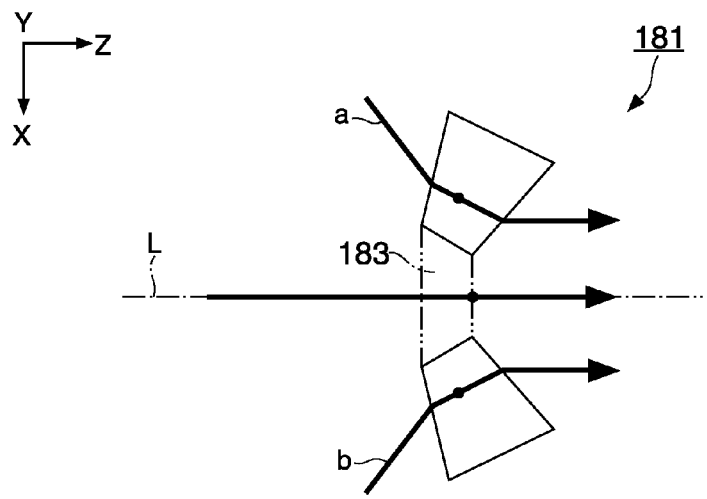
FIG. 22 shows another configuration example of the optical axis conversion element.

In the optical axis conversion element 171 shown in FIG. 21, in the event that it is not necessary to deviate the angle of the luminous flux from the first light source section 1, it is also acceptable to use an optical axis conversion element 181 in which a portion of parallel planes which transmits the luminous flux from the first light source section 1 is removed, forming a hollow portion 183, as shown in FIG. 22. In the case of using the optical axis conversion element 181 of this configuration, as the number of physical interfaces which transmit the luminous flux from the first light source section 1 decreases in comparison with the configuration of the optical axis conversion element 171 shown in FIG. 21, a light loss at the interfaces being reduced, it is possible to increase the light use efficiency in the optical axis conversion element.

Figure 23:
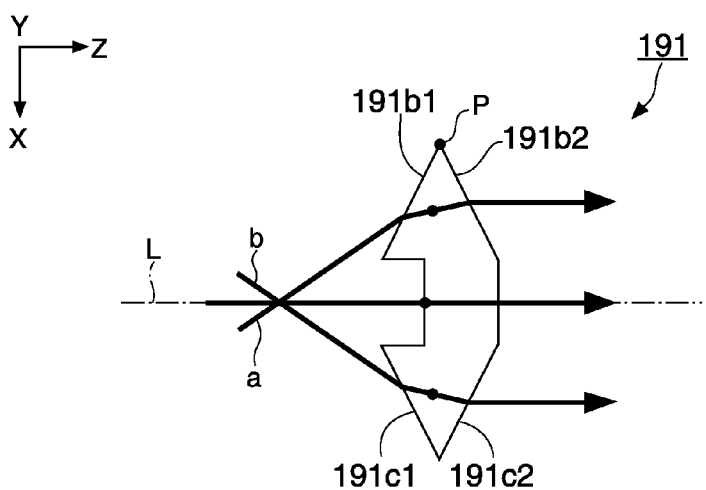
FIG. 23 shows another configuration example of the optical axis conversion element.

In the case in which the portions on which the luminous fluxes from the second light source sections 2a and 2b are incident are configured of nonparallel planes, it is also acceptable to employ an optical axis conversion element 191 of a configuration wherein virtual lines of intersection (in FIG. 23, a point P of intersection) between incident end faces 191b1 and 191c1 and exiting end faces 191b2 and 191c2 are positioned on the side more distant from the illumination optical axis L, as shown in FIG. 23, in place of the configuration of FIG. 21 wherein the virtual lines of intersection between the incident end faces and the exiting end faces are positioned on the side nearer to the illumination optical axis L. According to the optical axis conversion element 191 shown in FIG. 23, as a configuration is such that the illumination optical axes a and b of the two second light source sections 2a and 2b intersect each other, there is an advantage in that it is possible to miniaturize the illumination apparatus.

Figure 24:
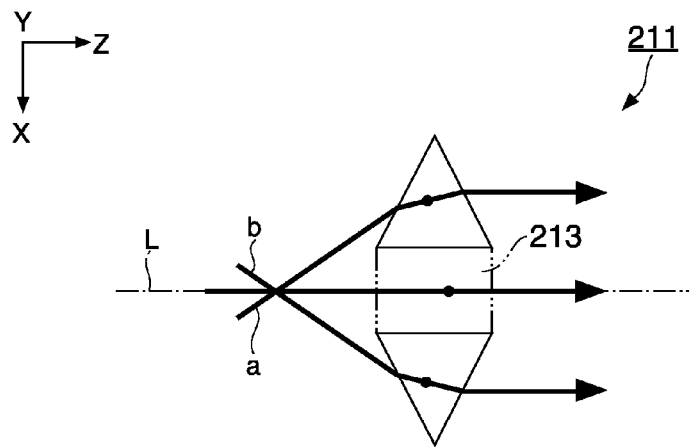
FIG. 24 shows another configuration example of the optical axis conversion element.

In the optical axis conversion element 191 shown in FIG. 23 too, in the case in which it is not necessary to deviate the angle of the luminous flux from the first light source section 1, it is also acceptable to use an optical axis conversion element 211 in which a portion of parallel planes which transmit the luminous flux from the first light source section 1 is removed, forming a hollow portion 213, as shown in FIG. 24. In the case of using the optical axis conversion element 211 of this configuration, as the number of physical interfaces which transmit the luminous flux from the first light source section 1 decreases in comparison with the configuration of the optical axis conversion element 191 shown in FIG. 23, a light loss at the interfaces being reduced, it is possible to increase the light use efficiency in the optical axis conversion element.

Also, the heretofore described optical axis conversion elements have been of the configuration wherein the luminous fluxes from the second light source sections 2a and 2b are refracted by both the incident end faces on which the luminous fluxes are incident, and the exiting end faces, which are the nonparallel planes, but it is also acceptable, in place of this configuration, to adopt a configuration wherein the luminous fluxes are refracted by only either the incident end faces or the exiting end faces.

Figure 25:
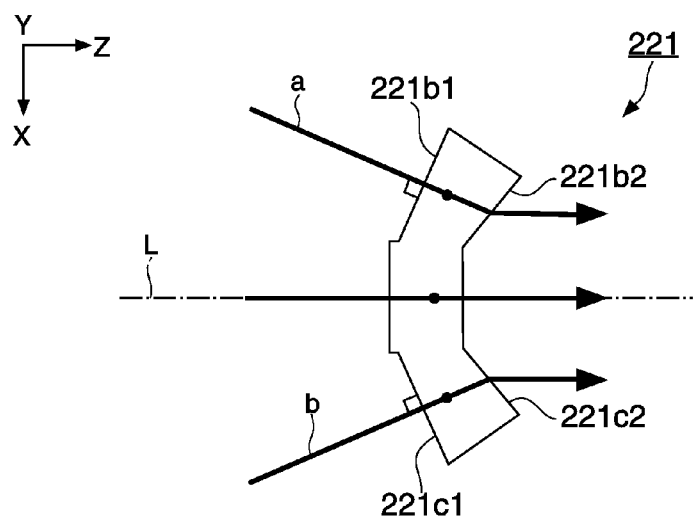
FIG. 25 shows another configuration example of the optical axis conversion element.

For example, in the case of an optical axis conversion element 221 shown in FIG. 25, the illumination optical axes a and b of the second light source sections 2a and 2b are disposed perpendicular to incident end faces 221b1 and 221c1. With this configuration, the luminous fluxes are not refracted by the incident end faces 221b1 and 221c1, but the luminous fluxes are refracted by exiting end faces 221b2 and 221c2, become parallel to the illumination optical axis L, and are emitted along the illumination optical axis L.

Figure 26:
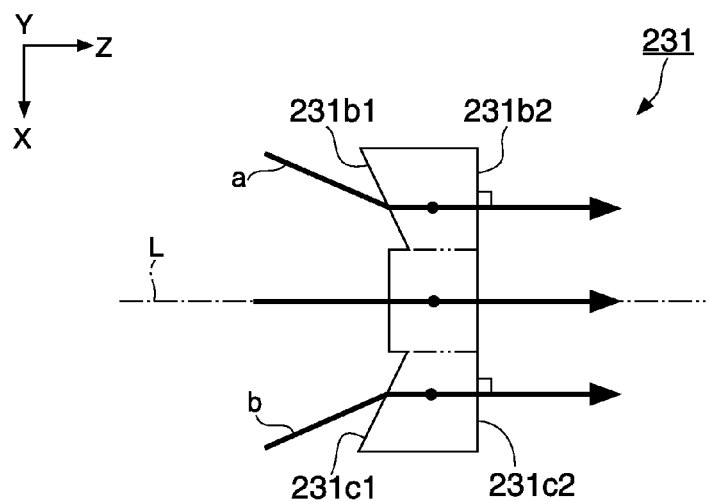
FIG. 26 shows another configuration example of the optical axis conversion element.

Meanwhile, in the case of an optical axis conversion element 231 shown in FIG. 26, the illumination optical axes a and b of the second light source sections 2a and 2b are not disposed perpendicular to incident end faces 231b1 and 231c1, but exiting end faces 231b2 and 231c2 are disposed perpendicular to the optical axes after being refracted by the incident end faces 231b1 and 231c1. With this configuration, the luminous fluxes are refracted by the incident end faces 231b1 and 231c1, and become parallel to the illumination optical axis L, but the luminous fluxes are not refracted by the exiting end faces 231b2 and 231c2, and are emitted along the illumination optical axis L.

In the case of using the optical axis conversion elements 221 and 231 shown in FIGS. 25 and 26, as it is possible to reduce a light loss at an interface on the side on which the luminous fluxes are perpendicularly incident, it is possible to increase the light use efficiency.

FIGS. 25 and 26 show a configuration example wherein the virtual lines of intersection between the incident end faces and the exiting end faces are positioned on the side nearer to the illumination optical axis L, as the disposition of two surfaces of the nonparallel planes, but in the case in which the luminous fluxes are refracted by only either the incident end faces or the exiting end faces in this way, too, it is possible to employ a configuration wherein the virtual lines of intersection between the incident end faces and the exiting end faces are disposed on the side more distant from the illumination optical axis L, as in the optical axis conversion element 191.

In the case of using an optical axis conversion element utilizing a refracting action too, the first light source section 1 does not always have to be disposed on the illumination optical axis L. For example, it is also acceptable to use one wherein a deviation prism 153 (the first light source section optical axis conversion element) is disposed adjacent to the incident side of the optical axis conversion element 151 shown in FIGS. 19A and 19B. In this case, the deviation prism 153 is disposed with the illumination optical axis c of the first light source section 1 tilted from the illumination optical axis L in such a way that the illumination optical axis L and the illumination optical axis c of the first light source section 1 intersect at an angle of other than 90 degrees. In this case, the tilt of the illumination optical axis c of the first light source section 1 from the illumination optical axis L is set in such a way that the luminous flux from the first light source section 1, after being refracted when being incident on an incident end face 153a of the deviation prism 153, is emitted from the optical axis conversion element 151 along the illumination optical axis L. By this means, the light from the first light source section 1 travels parallel to the illumination optical axis L in approximately the same direction as that of the lights from the two second light source sections 2a and 2b, and these lights are combined into approximately one light.

Figure 28:
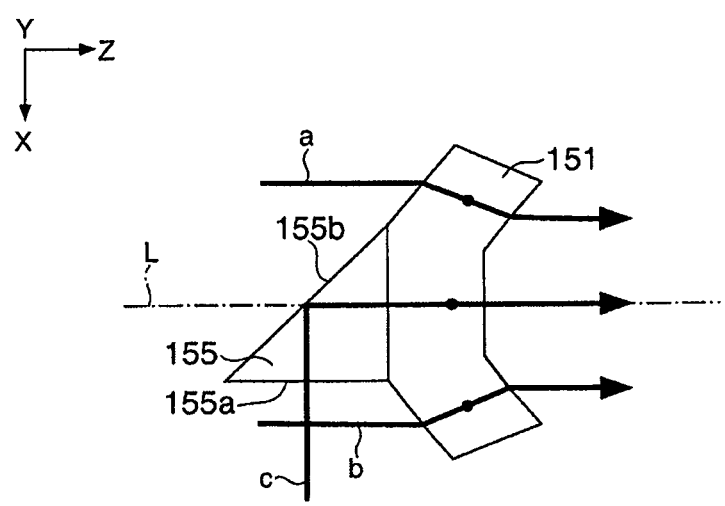
FIG. 28 shows another configuration example of the optical axis conversion element.

Alternatively, it is also acceptable to use one wherein a reflecting prism 155 (the first light source section optical axis conversion element) is disposed adjacent to the incident side of the optical axis conversion element 151 shown in FIGS. 19A and 19B, as shown in FIG. 28. In this case, for example, the first light source section 1 is disposed in such a way that the illumination optical axis L and the illumination optical axis c of the first light source section 1 intersect at approximately right angles. In this configuration, the light from the first light source section 1 is transmitted through an incident end face 155a of the reflecting prism 155 and, after being reflected by a total reflecting surface 155b, is emitted from the optical axis conversion element 151 along the illumination optical axis L. By this means, the light from the first light source section 1 travels parallel to the illumination optical axis L in approximately the same direction as that of the lights from the two second light source sections 2a and 2b, and these lights are combined into approximately one light.

Figure 27:
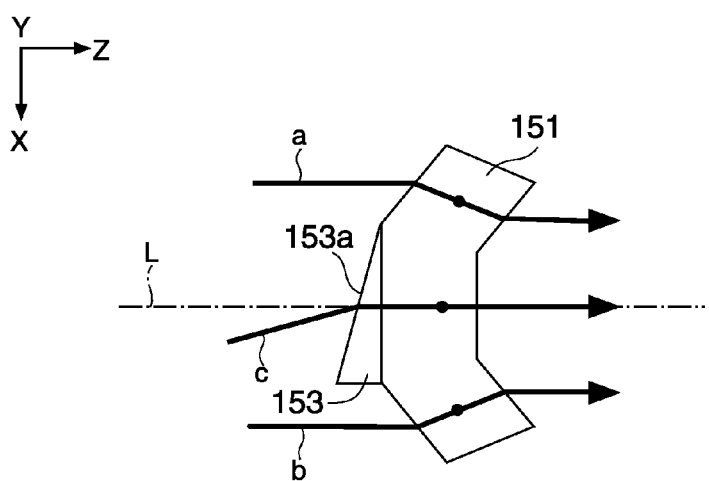
FIG. 27 shows another configuration example of the optical axis conversion element.

According to the configurations of FIGS. 27 and 28, as the first light source section 1 does not have to be disposed on the illumination optical axis L, the degree of freedom in the disposition place of the first light source section 1 being improved, it is possible in some cases to reduce a dimension of the illumination apparatus in a direction along the illumination optical axis L.

In the configuration of FIG. 28, it is also acceptable to dispose a reflecting mirror in the position of a total reflecting surface 155b of the reflecting prism 155, in place of providing the reflecting prism 155 on the incident side of the optical axis conversion element 151. In this case too, it is possible to obtain the same advantage as heretofore described.

Meanwhile, when wishing to change the traveling direction of light by a comparatively small angle, the case of utilizing the reflecting action is compared with the case of utilizing the refracting action.

Figures 29A, 29B:
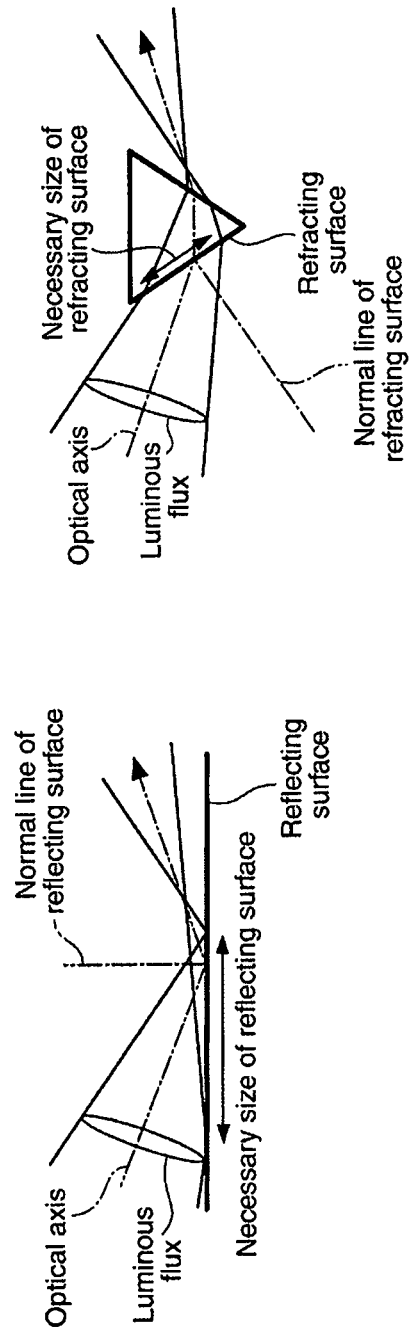
FIGS. 29A and 29B illustrate a difference in effectiveness between a reflecting action and a refracting action.

In the case of utilizing the reflecting action, as an angle formed by the optical axis of an incident luminous flux and the normal line of a reflecting surface is large, as shown in FIG. 29A, it is necessary to increase a size of the reflecting surface required for a luminous flux having a finite luminous flux diameter to be incident on. As opposed to this, in the case of utilizing the refracting action, as an angle formed by the optical axis of an incident luminous flux and the normal line of a refracting surface is small, as shown in FIG. 29B, it is sufficient that a size of the refracting surface required for a luminous flux having a finite luminous flux diameter to be incident on is small.

Herein, in the configuration of the projector 300 shown in FIG. 18, for example, in the case of assuming a configuration wherein the reflecting mirrors 152 are not provided on the light incident side of the optical axis conversion element 151, as a disposition is rendered such that the illumination optical axes a and b from the second light source sections 2a and 2b form a small angle with the illumination optical axis L, it is sufficient to change the traveling direction of the lights by a small angle, in order to make the illumination optical axes a and b parallel to the illumination optical axis L. In this kind of case, an optical axis conversion element utilizing the refracting action is effective, and it is possible in some cases to contribute to the miniaturization of the illumination apparatus.

The technological scope of the invention not being limited to the heretofore described embodiments, it is possible to make various modifications without departing from the scope of the invention. For example, with the heretofore described illumination apparatus, the integrator system including two lens arrays is employed as a uniform illumination system but, in place of this, an integrator system including a rod lens can also be used. In this case, a combining lens is used which has a kind of property of collecting luminous fluxes from individual light source sections, rather than approximately parallelizing them in the way heretofore described, and it is possible to adopt a configuration wherein, the rod lens being disposed in the position in which the individual luminous fluxes are collected, the luminous fluxes from the individual light source sections are caused to be incident on the rod lens. Alternatively, in the case of using a rod lens having a large aperture, it is also acceptable to adopt a configuration wherein the combining lens is removed and, the rod lens being disposed immediately after a polygonal truncated pyramid shaped reflector, the luminous fluxes from the individual light source sections are caused to be incident on the rod lens.

Apart from these, it is possible to appropriately modify specific configurations such as the shape, number and disposition of individual members configuring the illumination apparatus.

The entire disclosure of Japanese Patent Application Nos. 2008-71507, filed Mar. 19, 2008 and filed Jan. 27, 2009 are expressly incorporated by reference herein.

What is claimed is:
1. An illumination apparatus comprising:
a first light source section disposed on an illumination optical axis;
a plurality of second light source sections disposed in positions away from the illumination optical axis; and
an optical axis conversion element having an entrance face and an exit face and having a plurality of reflective surfaces which allows a light incident from the first light source section to emit in such a way that an exiting optical axis of the light approximately coincides with the illumination optical axis, and allows lights incident from the plurality of second light source sections to emit in such a way that exiting optical axes of the lights become approximately parallel to the illumination optical axis in positions close to the illumination optical axis, wherein
light from each respective second light source sections corresponding to a respective individual reflecting surface of the plurality of reflecting surfaces converges on a respective individual reflecting surface, or in the vicinity thereof,
each reflective surface having an area substantially equal to a cross sectional area of the light from the respective second light source section at the reflective surface, such that a cross sectional area of light exiting each second light source is larger than both the cross sectional area of light from the respective second light source section at the reflective surface and the area of the respective reflective surface,
light from the first light source section converges within the optical axis conversion element between the entrance and exit faces, at a position slightly toward the entrance face side of the exit face, and
the exiting optical axes of the lights emitted from the plurality of second light source sections are each disposed a distance away from the illumination optical axis, and the distance is set to half of a diameter of a collected light spot in which the light intensity is reduced to around 5% to 20% of a peak intensity.

2. The illumination apparatus according to claim 1, wherein
the light from the first light source section converges on the light exiting end of the optical axis conversion element, or in the vicinity thereof.

3. The illumination apparatus according to claim 1, wherein
the optical axis conversion element reflects and emits the lights emitted from each of the plurality of second light source sections.

4. The illumination apparatus according to claim 3, wherein
each of the individual reflective surfaces is tilted in such a way as to form a predetermined angle with the illumination optical axis; and
each of the lights emitted from the plurality of second light source sections is reflected by a corresponding individual reflecting surface among the plurality of reflecting surfaces.

5. The illumination apparatus according to claim 4, wherein
the reflecting surfaces of the optical axis conversion element are surface reflecting surfaces which surface reflect the lights emitted from each of the plurality of second light source sections.

6. The illumination apparatus according to claim 5, wherein
a dielectric multilayer is formed on the reflecting surfaces.

7. The illumination apparatus according to claim 4, wherein
the reflecting surfaces of the optical axis conversion element are total reflecting surfaces which totally reflect the lights emitted from each of the plurality of second light source sections.

8. The illumination apparatus according to claim 1, wherein
the optical axis conversion element refracts and emits the lights emitted from each of the plurality of second light source sections.

9. The illumination apparatus according to claim 1, wherein
the optical axis conversion element has a pair of parallel planes approximately perpendicular to the illumination optical axis, and
the light emitted from the first light source section is transmitted through the parallel planes.

10. The illumination apparatus according to claim 1, wherein
the optical axis conversion element has a hollow portion passing through in a direction in which the illumination optical axis extends, and
the light emitted from the first light source section is transmitted through the hollow portion.

11. The illumination apparatus according to claim 1, wherein
a first light source section optical axis conversion element which bends the optical axis of the light emitted from the first light source section is provided on the light incident side of the optical axis conversion element.

12. The illumination apparatus according to claim 1, wherein
a second light source section optical axis conversion element which bends the optical axis of the light emitted from at least one of the plurality of second light source sections is provided on the light incident side of the optical axis conversion element.

13. The illumination apparatus according to claim 1, wherein
a heat dissipation member is provided on the optical axis conversion element.

14. The illumination apparatus according to claim 1, wherein
the optical axis conversion element is housed in a casing having a light transmissivity.

15. A projector comprising: the illumination apparatus according to claim 1; an optical modulator which modulates light from the illumination apparatus; and a projection system which magnifies and projects the light modulated by the optical modulator.

16. The illumination apparatus according to claim 1, wherein the illumination optical axis corresponds to a normal line that is perpendicular to a surface to be illuminated of an illumination object.

17. The illumination apparatus according to claim 16, wherein the illumination object is a light valve.

18. An illumination method comprising:
providing an optical axis conversion element having an entrance face and an exit face and having a plurality of reflective surfaces; and
allowing a light emitted from a first light source section disposed on an illumination optical axis to emit toward an illumination object in such a way that an exiting optical axis of the light approximately coincides with the illumination optical axis, and lights emitted from a plurality of second light source sections disposed in positions away from the illumination optical axis to emit toward the illumination object in such a way that exiting optical axes of the lights become approximately parallel to the illumination optical axis in positions close to the illumination optical axis;
light from each respective second light source sections, corresponding to a respective individual reflecting surface of the plurality of reflecting surfaces, converging on a respective reflecting surface, or in the vicinities thereof, each reflective surface having an area substantially equal to a cross sectional area of the light from the respective second light source section at the reflective surface, such that a cross sectional area of light exiting each second light source is larger than both the cross sectional area of light from the respective second light source section at the reflective surface and the area of the respective reflective surface,
light from the first light source section converges within the optical axis conversion element between the entrance and exit faces, at a position slightly toward the entrance face side of the exit face, and
the exiting optical axes of the lights emitted from the plurality of second light source sections are each disposed a distance away from the illumination optical axis, and the distance is set to half of a diameter of a collected light spot in which the light intensity is reduced to around 5% to 20% of a peak intensity.

* * * * *